United States Patent
Dusseault et al.

(10) Patent No.: US 9,316,093 B2
(45) Date of Patent: Apr. 19, 2016

(54) SEQUESTRATION OF GREENHOUSE GASSES BY GENERATING AN UNSTABLE GAS/SALINE FRONT WITHIN A FORMATION

(71) Applicants: Roman Bilak, Calgary (CA); Maurice B. Dusseault, Waterloo (CA)

(72) Inventors: Maurice B. Dusseault, Waterloo (CA); Farshad A. Malekzadeh, Calgary (CA)

( * ) Notice: Subject to any disclaimer, the term of this patent is extended or adjusted under 35 U.S.C. 154(b) by 0 days.

(21) Appl. No.: 14/137,784

(22) Filed: Dec. 20, 2013

(65) Prior Publication Data

US 2014/0186119 A1    Jul. 3, 2014

Related U.S. Application Data

(63) Continuation-in-part of application No. PCT/CA2012/050418, filed on Jun. 22, 2012.

(60) Provisional application No. 61/500,966, filed on Jun. 24, 2011.

(51) Int. Cl.
    *E21B 41/00*    (2006.01)

(52) U.S. Cl.
    CPC .............. *E21B 41/0064* (2013.01); *Y02C 10/14* (2013.01)

(58) Field of Classification Search
    CPC .................................................. E21B 41/0064
    USPC .......................................... 405/129.35, 129.1
    See application file for complete search history.

(56) References Cited

U.S. PATENT DOCUMENTS

| | | | |
|---|---|---|---|
| 4,848,466 A * | 7/1989 | Lin ................................ | 166/402 |
| 6,412,559 B1 * | 7/2002 | Gunter et al. .................. | 166/271 |
| 2007/0261844 A1 * | 11/2007 | Cogliandro et al. .......... | 166/248 |
| 2009/0062593 A1 | 3/2009 | Bruno et al. | |
| 2009/0202304 A1 | 8/2009 | Koide et al. | |
| 2010/0116511 A1 * | 5/2010 | Ramakrishnan et al. ..... | 166/400 |
| 2010/0243248 A1 * | 9/2010 | Golomb et al. ............... | 166/270 |
| 2013/0259575 A1 * | 10/2013 | Hoier et al. ............... | 405/129.35 |

FOREIGN PATENT DOCUMENTS

| WO | 2004095259 A1 | 11/2004 |
|---|---|---|
| WO | 2012041926 A2 | 4/2012 |

OTHER PUBLICATIONS

Juanes, et al. "Impact of relative permeability hysteresis on geological CO2 storage" Water Resources Research, vol. 42, W12418, doi:10.1029/2005WR004806, 2006.*

(Continued)

*Primary Examiner* — John Kreck
(74) *Attorney, Agent, or Firm* — Patterson & Sheridan, LLP

(57) ABSTRACT

A method is provided for sequestration of a greenhouse gas in a water-laden formation by injection of a fluid comprising greenhouse gas (GHG) into a formation under conditions suitable for generating an unstable front of said greenhouse gas within the formation. The injection may comprise a first stage wherein a gas phase comprising CO2 is injected into the formation, followed by a second stage comprising injecting an aqueous liquid into the formation, to thereby generate an unstable front within the formation that results in relatively rapid dissolution of the injected CO2 within the formation water. The cyclic nature of the injection, alternating between GHG and water injection, can be repeated for a number of times until the carrying capacity of the formation is deemed to have been reached.

15 Claims, 13 Drawing Sheets

(56) References Cited

OTHER PUBLICATIONS

"Injection and Storage of CO2 in Deep Saline Aquifers: Analytical Solution for CO2 Plume Evolution During Injection", Nordbotten et al., Transp Porous Med (2005) 58:339-360.
International Search Report for application No. PCT/CA2012/050418 dated Aug. 28, 2012.
European Search Report for Application No. EP 12803141.6 dated Nov. 11, 2015.
Jan Martin Nordbotten et al., "Injection and Storage of CO2 in Deep Saline Aquifers: Analytical Solution for CO2 Plume Evolution During Injection", Transport in Porous Media, Kluwer Academic Publishers, DO, vol. 58, No. 3, Mar. 1, 2005, pp. 339-360, XP019268789, ISSN: 1573-1634.

\* cited by examiner

SEQUESTRATION OF GREENHOUSE GASSES BY GENERATING AN UNSTABLE GAS/SALINE FRONT WITHIN A FORMATION

CROSS REFERENCE TO RELATED APPLICATIONS

This is a Continuation-in-Part of PCT application no. PCT/CA2012/050418 filed on Jun. 22, 2012, which claims priority pursuant to the Paris Convention to U.S. application No. 61/500,966 filed on Jun. 24, 2011. The contents of said applications are incorporated by reference herein.

FIELD OF THE INVENTION

The invention relates to greenhouse gas sequestration in a geological formation by injection of the gas into the formation.

BACKGROUND OF THE INVENTION

Removal of $CO_2$ and other greenhouse gasses ("GHG") from the atmosphere by sequestration within deep geological formations has long been seen as a potential solution to the problems presented by the buildup of these gasses in the atmosphere. Typically, a gas mixture that is rich in a greenhouse gas component is injected into an aquifer such that the gas mixture or the greenhouse gas component thereof dissolves into and is sequestered within the aquifer. The gas mixture may comprise effluent from a fossil-fuel burning plant or other source, optionally enriched in its greenhouse gas component.

Unfortunately, efforts to economically sequester GHG on a commercial scale have thus far been elusive. One issue has been the relatively slow speed at which gasses are absorbed and trapped within a formation using conventional injection techniques. In particular, in conventional processes the front that arises of the injected gas can be slow to advance within the formation, leading to a slow rate of mixing and dissolution of the gasses into the formation water.

Injection of a non-aqueous phase into a water-wet saturated porous medium is a process that appears many times in energy resource extraction (gas injection, solvent injection), hydrogeology (gasoline leakage, air injection, contamination by dense non-aqueous petroleum liquids such as chlorinated hydrocarbon), environmental engineering (such as air sparging for site cleanup), and chemical process engineering (such as operation of fabricated porous reaction beds perhaps containing solid catalysts). The physical process of multiphase flow is usually divided into simultaneous mechanical and chemical interactions of the fluids and the solid skeleton, depending on the nature of the problem being addressed.

Carbon Capture and Sequestration (CCS) is a candidate method to control GHG concentrations in the atmosphere, thereby reducing the magnitude of the predicted effects, and ideally CCS would help to stabilize and eventually even reduce the atmospheric $CO_2$ concentration level. One approach to CCS involves the separation of $CO_2$ from a gaseous stream such as flue gas from a coal-fired power plant, a carbon dioxide enriched stream from novel methods of coal combustion, from cement kilns, from ammonia plants or other chemical manufacturing plants, or from other point sources. The separated $CO_2$ is purified to a level where it can be injected deep into a porous saline aquifer. In the past, it has been generally assumed that the $CO_2$ must be essentially pure so that it can be injected in the supercritical state (a compressible liquid of low viscosity and moderate density—0.60-0.75 g/cm$^3$). Herein, super-critical $CO_2$ is abbreviated as SC-CO2. Capturing the $CO_2$ component from the point source, compression and transportation of $CO_2$, and finally depositing it into a secure subsurface formation, are the general parts of various CCS systems.

CCS by injection into deep geological formations is a potential disposal (storage) method. Technology for deep injection of gaseous or supercritical phases exists in oil and gas industries, though injection process optimization using horizontal wells, cyclic injection of water and $CO_2$, trap security and long-term risk, and related subjects remain of research interest (Bachu et al., 1994; Stevens et al., 2008).

Because of the lower density compared to the saline water present in deep aquifers, a buoyancy effect is an intrinsic characteristic property of the injected $CO_2$-enriched gas and remains associated with the accumulation of the injectate as a free phase near the top of the saline aquifer. The late time configuration after years to decades of injection is a thick overlying zone of the buoyant materials, which gives a permanent risk of leakage from the cap rock or any sealing formation. This free cap of buoyant $CO_2$ as a gas or as SC-CO2 remaining in place for hundreds to thousands of years remains a major concern for all saline aquifer sequestration methods that involve a discrete upper buoyant $CO_2$ accumulation.

Even though several partial barriers to upward movement may exist, as long as there is a thick cap of the less dense phase, there is the possibility of leakage leading to the eventual escape of the sequestered GHG.

Hydrodynamic trapping mechanisms are considered as the least secure and the least reliable isolation alternative, in contrast to dissolution processes where the $CO_2$ is dissolved in the aqueous phase, solidification of the injected $CO_2$ in terms of generating solid mineral precipitates through reactions at depth (likely impractical), or the direct injection of carbon-rich solid matter such as petcoke (petroleum coke), biosolids or other biological wastes.

SUMMARY OF THE INVENTION

The present invention is based on the discovery that enhanced GHG sequestration in the dissolved state can be achieved by optimizing certain characteristics and dynamics of an injected gas (or SC-CO2) front within a saline aquifer. The invention is based in part on an analytical framework that the inventors have developed for quantification of dynamic interfacial interaction between an injected gas (or SC-CO2) and the host saline liquid filling the pore space. Such interactions have been previously studied by Nordbotten et al. ([1] and [2]), Hesse et al. [3] and Juanes et al. [4]. In the present invention, the analytical frame-work is more general and is not based on a sharp interface approximation and in contrast to previous works, the effects of the unstable front are included. In the approach, evolution of a rarefaction wave where there is no sharp front, but a transition zone of varying saturation with time is calculated and a simple method based on the capillary pressure concept is introduced to estimate the position of isosaturation contours (isosats) within this transition zone for different times (an isosat is a surface on which the gas and fluid saturations are constant, similar to a surface of constant pressure or temperature, for example). According to one aspect, the method described herein is suitable for the injection of a purified or partially purified stream of gas where $CO_2$ constitutes about 60-100% by mass of the gas mixture. The injected gas may be in the form of a super-critical fluid.

The present invention also relates to optimizing gas and liquid injection parameters to take into account gravity override that is normally driven by fluid density differences, as well as the capillary forces acting within the formation.

According to one aspect, the invention relates to a method for sequestration of a greenhouse gas in a water-laden porous and permeable formation, by injection of a fluid comprising said greenhouse gas into said formation, under conditions suitable for generating and maintaining the transition zone of said greenhouse gas within said formation. Said transition zone may comprise a plurality of viscous finger-shaped projections of the injected GHG extending into said formation, that forms the unstable transition zone between said GHG and the native aqueous aquifer within said formation.

In one aspect, the method comprises a first injection step, comprising injecting a gas phase comprising CO2 into said formation, followed by a second injection step, comprising an aqueous liquid phase, of injecting said aqueous liquid phase into said formation. The gas phase may comprise dry SC-CO2 or a mixture of $CO_2$ and other gasses. In a process referred to as solubility trapping, the gas becomes trapped (absorbed) within liquid present in the formation. The aqueous and GHG phases can be cycled (alternated) repeatedly during the course of the injection process, which can be for a duration of days, months or years. The individual phases can each have the same or different durations, and may respectively each comprise minutes, hours, days or weeks in time frame. The aqueous liquid that is injected may be one or more of waste water, water produced with oil during an oil production operation, industrial effluent, municipal waste water, brackish water, fracturing fluids flowback water, seawater, water that contains any dissolved contaminant, including natural formation waters containing dissolved sodium chloride and other salts. The gaseous phase may comprise pure SC-CO2 or a mixture of CO2 and one or more other gases. In one aspect, the mixture comprises at least 50% or 60% CO2. In other aspects, the mixture comprises 60-90%, 60-80% or 60-70% CO2.

In the present invention, the durations of the first and second phases may be determined from the rate of dissolution of the gas within the formation, which is accelerated by the aforementioned fingering that forms the transition zone, the backward CO2 flux within the formation, and the intensity of the salt precipitation process within the formation.

The conditions of injecting the fluids may include injection of said fluids at a temperature that is substantially equal to the temperature of the formation at the location or locations where said fluid is injected.

According to one aspect, a method for sequestration of a greenhouse gas is based on and derived from a model which approximates a real-world subsurface formation. Application of the analytical solution developed to quantify the dissolution process with the appropriate conditions permits calculation of the lateral spreading of said injected GHG in a porous media, which is viewed as being confined with impermeable formations on the top and the bottom of the saline aquifer target formation.

BRIEF DESCRIPTION OF THE DRAWINGS

FIG. 2A Structural Trap; FIG. 2B Stratigraphic Trap; FIG. 2C Laterally Extensive Caprock Trap; FIG. 2D Long Flow Path Trap.

FIGS. 10A-C show the spatial distribution within a formation of CO2 of saturation levels following cyclical injection of gas and water phases. FIGS. 10D-F show similar results for CO2 concentration levels within the formation.

DETAILED DESCRIPTION

Figure 1:
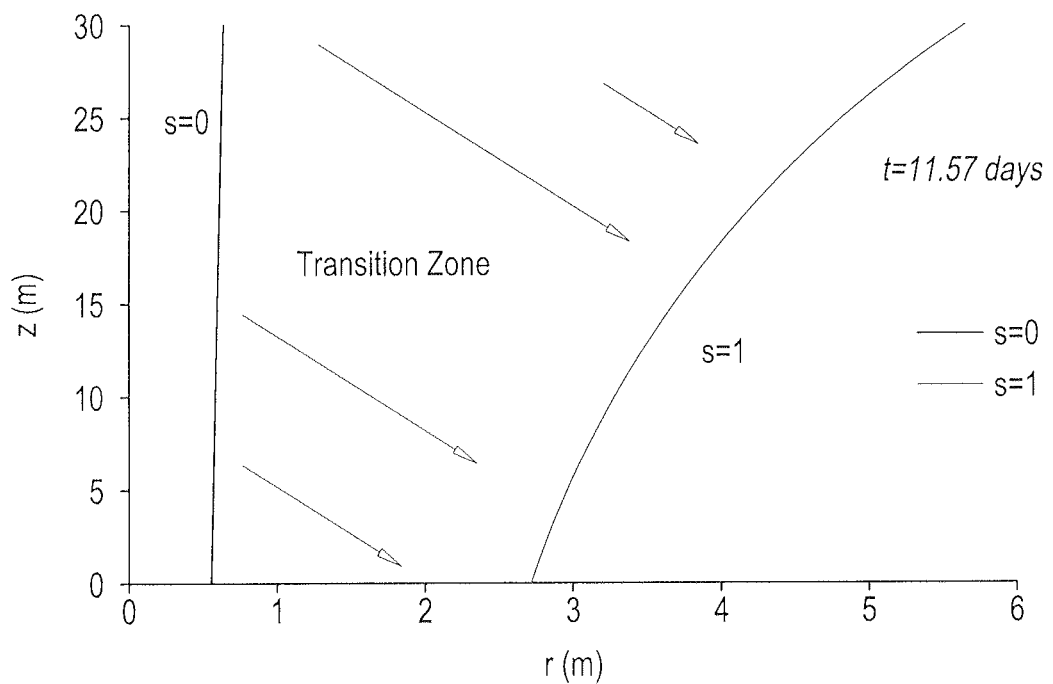
FIG. 1 consists of graphs showing isosats of s=0 and s=1 in t=106 (sec) top graph and t=108 (sec) bottom graph.
Figure 1:
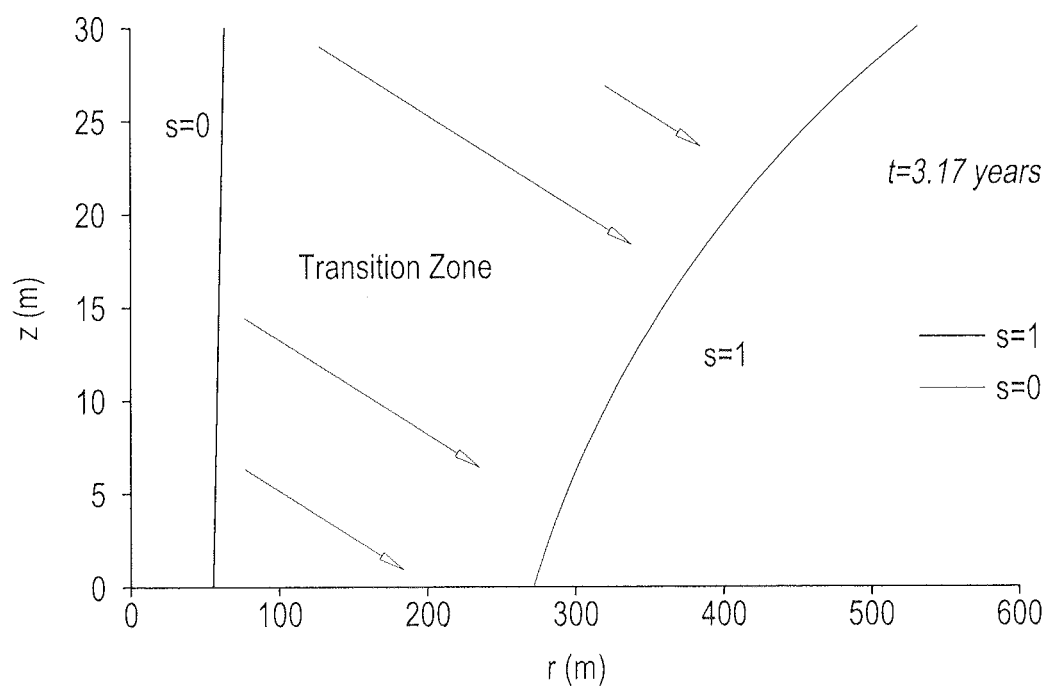

The assumptions in the model which is used in the present invention are the same as the aforementioned works ([1] to [4]), which are
1. Capillary pressure is negligibly small compared to the generated pressure during injection.
2. Velocity of both gas and liquid is horizontal and vertical pressure distribution is hydrostatic.
3. Porous layer is laterally infinite, but vertically finite and bounded by impermeable layers.
4. The shape of the GHG or water injection zone is approximately regular, such as circular or elliptical in shape, reflecting an assumption that the target formation is homogeneous and approximately isotropic in its flow properties at a scale of centimeters and larger.
5. Relative permeability functions and the Leverett J function are linear in nature.
6. During the injection, compaction and expansion of the GHG phase are negligible because injection is sensibly at a constant pressure not exceeding limits determined and set by the regulatory agency in the jurisdiction where sequestration is taking place.
7. Evaporation of the phases is negligible.
8. Any effect on permeability associated with salt precipitation is negligible.

The assumptions in the present invention are typical of all similar analytical solutions and are widely accepted, but this new approach to analysis and design includes the effect of viscous fingering which develops a continuous transition zone of varying saturation from the gaseous rich zone to the saline water rich zone. In other words, the mathematical framework is not based on the sharp interface which has characterized other analytical and semi-analytical solutions to date and is a severe limitation because it does not permit an assessment of mixing volume and dissolution time. The sharp interface assumption is not physically correct when the displacing gas is less viscous than the displaced fluid, and the new solution overcomes this deficiency. The model described herein approximates real world formations and the parameters of fluid injection therein with sufficient accuracy to permit this model to serve as the basis for a useful method for greenhouse gas sequestration.

Because of the lower viscosity of the gas, the Darcian velocity of the injected gas is orders of magnitude higher than the velocity of the host saline water, and that leads to a growing two-phase zone [6], the transition zone, where mixing and dissolution are taking place.

By reducing the set of flow equations in the mathematical formulation to a set of hyperbolic equations, based on the front tracking method where self-similarity of the isosaturation contours is assumed, two types of continuous and discontinuous solutions are available. For most relative permeability functions, a higher or equal viscosity of the injected fluid results in a sharp interface (a shock wave, but not in the dynamic sense) but lower viscosity of the injected gas results in a rarefaction wave [5]. The shock wave is the mathematical expression of a sharp jump in saturation associated with the capillary entry pressure of the injection formation and the fact that the two fluids (said GHG and said saline water) are not miscible in the short-term. The rarefaction wave is the mathematical expression of the transition zone, where the saturation of said GHG varies from 100% to the value of the sharp jump that defines the shock wave.

The present invention is based in part on the general mathematical framework that describes and predicts the effect of viscous fingering, the nature of the shock and rarefaction waves, and through applying the set of reasonable assumptions listed above, the mathematical formulation is reduced to a 1D classical Buckley-Leverett equation that can be solved to give the location of the shock wave and rarefaction wave, as well as the value of the sharp jump that characterized the shock wave. It is obvious that the change of saturation in the transition zone is gradual and continuous if a linear set of relative permeability values are applied to the homogeneous porous medium.

In one aspect, the invention relates to a method for maximizing the dissolution rate of the injected GHG so that in a reasonable time frame it becomes totally dissolved in the saline water, a sequestration condition referred to as solubility trapping, and considered to be far more secure than sequestration in the gaseous or super-critical state. The solubility of $CO_2$ in saline aquifer water with pressure, temperature and salinity of target formations at typical depths (800 m to 3000 m) and temperatures (35-60° C.) is about 5% of the mass of the saline aqueous phase, and that provides an increased capacity for solubility trapping in porous media provided that the volumes of water available and that the dissolution rate is reasonable. In a typical prior art injection process where a thick SC-CO2 cap zone is created, the rate of dissolution is slow because of almost stagnant conditions and because the mass transfer of CO2 from the gaseous or supercritical state to the saline water is based on diffusion, which is very slow and time consuming. Typically, thousands or even several tens of thousands of years are needed to achieve >95% dissolution of a thick CO2 cap zone.

During the injection of SC-CO2 into a water-wet water-saturated formation, the SC-CO2 does not simply displace the water, it forms a gradual saturation transition zone, comprised of a continuous part (the rarefaction wave) and a discontinuous part (the shock wave). The discontinuous front of drainage moves faster than the rate at which the SC-CO2 is injected through the process of viscous fingering because the SC-CO2 is far less viscous than water, and because of dispersion arising from a heterogeneous distribution of pore throats at the microscopic scale, which forms local partial capillary barriers to invasion of the injected GHG. This leads to a transition zone that is growing in width within which the saturation of CO2 varies from nearly 100% near the wellbore to 0% at the advancing edge of the transition zone (the location of the leading shock wave). The generation of this transition zone is critical to the new process as it provides an increased surface contact area between the CO2 and the saline water, which results in faster interfacial mass transfer, or, in other words, faster dissolving of the CO2 into the water, leading to the highly secure solubility trapping condition far earlier than otherwise calculable or expected.

The mass transfer processes between phases (gaseous and liquid) during injection include Forward $CO_2$ mass transfer from gas to the saline phase (dissolution)

Backward water mass transfer from saline to gas (vaporization)

Backward $CO_2$ mass transfer from saline to gas because of vaporization (nucleation or bubbling)

Forward water mass transfer from gas to liquid (liquefaction)

Backward salt mass transfer from saline to solid skeleton (precipitation)

All of the above mentioned mass fluxes occur simultaneously but at different rates and at different locations in the porous aquifer. Dissolution and nucleation mechanisms have the most significant contribution to the solubility trapping rate and capacity. Liquefaction is negligibly small during the injection process and precipitation of salt may change the porosity and permeability characteristics of rock slightly and in some circumstances (e.g. a saline aquifer where the water is fully saturated with sodium chloride) could be important as an injection rate limiting process. In the new mathematical analysis method this impact is assumed to be negligible in order to develop the mathematical solution, and in practice, injection will generally take place in saline aquifers that are not fully saturated with sodium chloride, so the effect can be assumed to be reasonably small or infrequent. Furthermore, as shown below, any precipitated salt will be washed back into a dissolved state through the cyclic injection proposed as a fundamental part of this invention.

By continuous injection of the GHG in the form of dry gaseous or SC-CO2 into a water-saturated medium, a local thermodynamic equilibrium is achieved instantaneously at the interfaces between the two phases, but the region at the interface is not in equilibrium with the bulk liquid and bulk gas beyond the interface, and this triggers the diffusive mass transfer process of the GHG into the saline liquid, powered by Brownian motion, forced convection (from the pressure of injection), and density convection at the small scale because of local changes in the liquid density as the GHG dissolves into the saline water. By continuous injection, simultaneous dissolution and vaporization happen and the process of nucleation (backward CO2 flux) may occur. In this condition, the total amount of the dissolved CO2 in the water drops as the gas is coming out of dissolution (exsolution). At this point, the process of injection should be stopped and water, preferably waste water that is undersaturated with respect to salt (NaCl), should be injected to wash the precipitated salt, further displace the GHG transition zone into the sequestration aquifer, and push the more distant CO2-saturated saline water away from the well. This water injection phase continues to push the previously-created transition zone away from the wellbore, accelerating its dissolution into the saline aquifer water. This calculable process leads to a series of cycles of gaseous or SC-CO2 injection, followed by periods of water injection, carried out in such a way as to maximize the surface area between the CO2 and the water so that the maximum practical rate of dissolution is achieved. The frequency of injection cycles is dependent on the characteristics of the porous formation, the ambient conditions (temperature, pressure, water salinity) which affect the dissolution rate of CO2 into the water phase, and the rate of injection. These conditions may be readily determined by person skilled in the art, and the frequency and other conditions of the injection cycles may be optimized based on the determined conditions and the new mathematical formulation.

The episodically injected water phase is preferably waste water such as water co-produced with oil during oil production operations (many barrels of water are usually co-produced for each barrel of oil produced in an oil producing region), waste water from treatment facilities such as pulp and paper mills, water from sewage treatment in municipal facilities, brackish water, fracturing fluids flowback water, saline ocean water (which is greatly undersaturated in salt) or other sources of water that do not have commercial value or the possibility of human use without massive treatment. Such water can contain any number of hazardous or non-hazardous dissolved constituents and therefore the process of episodic water co-injection constitutes a two-fold benefit, the sequestration of the CO2 in the secure dissolved state, and the disposal of waste water.

The gaseous phase, which is episodically injected, can be pure SC-CO2 or a mixture of CO2 and other gases in any proportion. However, given the need to dissolve the gases into the water phase (saline aqueous phase) in a typical saline aquifer, it is understood that a gaseous phase can be enriched in CO2 through some technology (such as amine separation or membrane enrichment) or as a consequence of the process (such as ammonia or C2H4 manufacture).

At the aquifer scale, a larger transition zone proves a faster rate of mass transfer because of the larger internal interfacial area available to speed up the diffusion process. Based on existing analytical models, the contrast of viscosity between the gaseous (or supercritical) phase and the saline aqueous phase is favorable for enlarging the rate of growth of the transition zone. The smaller the viscosity of the gaseous phase with respect to the water phase, the greater the viscous fingering effect, and the more rapid the growth of the transition zone of large internal surface area between the phases. This viscosity contrast tends to be higher at lower depth, and decreases at higher depth, largely because of the effects of temperature on the viscosity of the phases. Additionally, a low permeability of the aquifer will enlarge the size of the transition zone because the radial capillary force is higher and thus the contours of constant saturation are closer to horizontal flat lines, rather than being inclined. Thus, injection into a lower permeability medium that is shallower will tend to maximize the size of the transition zone.

As mentioned above, the characteristics of the porous target formation should be selected based on measurements and analysis of certain properties. The target formation can be a natural geologic formation or an artificial porous formation can be provided at the surface for mixing and dissolution of the GHG into the aqueous phase. In a typical realization, such a man-made dissolving porous bed will be operated in such a manner as to have a large surface contact area between the phases, and the bed will be maintained at a pressure and a temperature (controlled by controlling the temperature of the injected phases) most suitable to give the best rate of dissolution. Then, the effluent from such a bed will be water (brackish or waste water) that is fully saturated with CO2 at the bed conditions and it can be injected directly for permanent sequestration into a porous permeable aquifer at depth. The dissolution reaction porous bed will be in the scale of several thousand cubic meters and disposed in such a manner as to sustain the necessary pressure (in a containment vessel for example or on the sea floor at depths greater than 800 m).

This approach to a mixing technology is different from ex-situ mixing process where CO2 is merely introduced into water and mixed, because the size of the reactor is huge compared to typical cells and the flow regime is laminar in the porous formation, not turbulent as in free-phase mixing (higher energy requirements for mixing). The porous diffusion dissolution system can be located close to the injection well. The main advantage of doing this is to reduce the buoyancy effect by pre-dissolving CO2 in saline water, and injecting the aqueous solution in the subsurface, where it will not experience buoyancy forces, and will remain stable indefinitely.

In one aspect, this process thus consists of cyclic injection of CO2-water in the porous formation using a suitable injection fluid (gaseous CO2 mixed with other gases or SC-CO2). Horizontal wells will generate large transition zones of great volume, and the period of injection should be calculated from the rate of dissolution, analysis of the nucleation process (backward CO2 flux) and the intensity of the plugging (salt precipitation) process.

Generalized Mass Conservation Equation

In order to derive the governing equations for propagation of a saturation front from a point source injection, a mass conservation equation over an isosat (a surface of constant saturation) is written. If $\lambda_w$ and $\lambda_n$ be the wetting and nonwetting mobilities, $\gamma_n$ and $\gamma_w$ be the specific weight of wetting and nonwetting fluids, $u_w$ and $u_n$ are the Darcian velocity of wetting and nonwetting phases $Q_o$ be the total rate of injection then $$\bar{u}_w = -\lambda_w \nabla p_w + \lambda_w \gamma_w \bar{e}_y \qquad (1)$$

$$\bar{u}_n = -\lambda_n \nabla p_n + \lambda_n \gamma_n \bar{e}_y \qquad (2)$$

$$\nabla \cdot \bar{u}_w = \frac{\varphi \partial s}{\partial t} \qquad (3)$$

$$\bar{u}_t = \bar{u}_w + \bar{u}_n = -\lambda_w \nabla p_w - \lambda_n \nabla p_n + (\lambda_w \gamma_w + \lambda_n \gamma_n) \bar{e}_y \qquad (4)$$

$$Q_o = \oint_\Gamma \bar{u}_t \cdot \bar{n} = \oint_\Gamma -(\lambda_w + \lambda_n) \nabla p \cdot \bar{n} + \oint_\Gamma (\lambda_w \gamma_w + \lambda_n \gamma_n) \bar{e}_y \cdot \bar{n} \qquad (5)$$

If $\Gamma$ be chosen as an isosat, mobilities remain constant over $\Gamma$ and it makes it possible to bring them out of the integral. At this point the position of the saturation curves are not yet determined. By introducing the fractional flow $$F(s) = \frac{\lambda_w}{\lambda_w + \lambda_n} \qquad (6)$$

It is possible to introduce Eq. 6 into Eq. 5, giving $$F(s)Q_o = \oint_\Gamma -\lambda_w \nabla p \cdot \bar{n} + \oint_\Gamma F(s)(\lambda_w \gamma_w + \lambda_n \gamma_n) \bar{e}_y \cdot \bar{n} \qquad (7)$$

-continued $$F(s)Q_o = \oint_\Gamma -\lambda_w \nabla p \cdot \bar{n} + \oint_\Gamma \lambda_w \gamma_w \cdot \bar{n} - \oint_\Gamma \lambda_w \gamma_w \cdot \bar{n} + \oint_\Gamma F(s)(\lambda_w \gamma_w + \lambda_n \gamma_n) \bar{e}_y \cdot \bar{n} \quad (8)$$

$$\oint_\Gamma \frac{F(s)Q_o \bar{n} \cdot \bar{n}}{CI(\Gamma)} = \oint_\Gamma (-\lambda_w \nabla p + \lambda_w \gamma_w \bar{e}_y) \cdot \bar{n} + \oint_\Gamma \lambda_n F(s)(\gamma_n - \gamma_w) \bar{e}_y \cdot \bar{n} \quad (9)$$

CI stands for the circumference of the isosat ($\Gamma$) and the last term in Eq. 9 vanishes $$\oint_\Gamma \lambda_n F(s)(\gamma_n - \gamma_w) \bar{e}_y \cdot \bar{n} = \lambda_n F(s) \Delta \gamma \oint_\Gamma \bar{e}_y \cdot \bar{n} = 0 \quad (10)$$

By the help of the divergence theorem $$\int_\Omega \nabla \cdot \left( \frac{F(s)Q_o \bar{n}}{CI(\Gamma)} \right) = \int_\Omega \nabla \cdot \bar{u}_w \quad (11)$$

And, similar to mass conservation for the wetting phase (Eq. 3), it is possible to write Eq. 11 as $$\int_\Omega \nabla \cdot \left( \frac{F(s)Q_o \bar{n}}{CI(\Gamma)} \right) = \int_\Omega \frac{\varphi \partial s}{\partial t} \quad (12)$$

And in a general way $$\nabla \cdot \left( \frac{F(s)Q_o \bar{n}}{CI(\Gamma)\varphi} \right) = \frac{\partial s}{\partial t} \quad (13)$$

Eq (13) is a general mass conservation, regardless of the regime of injection. The circumference of the isosat and its normal vector comes from the position of the isosat, therefore determination of its position is necessary for the solution of Eq. 13. Determination of the position of isosats is not trivial in the general case as it is in a geometrically regular geometry (linear, cylindrical and spherical cases).

In a general injection case, a network of isosats and streamlines are generated. Contours of saturation represent the isosat's position, and by keeping the boundary condition constant during the injection process, isosats become a series of parallel curves. The gradient of the isosat represents the velocity of water movement perpendicular to the isosat curve. It is possible to define two series of curves, $\eta$s and $\xi$s, representing isosat and stream line curves, and introducing a coordinate transformation to an orthogonal system with orthogonal bases expressed as $$\bar{e}_\eta = h_\eta \nabla \eta \quad (14)$$

$$\bar{e}_\xi = h_\xi \nabla \xi \quad (15)$$

$$\bar{e}_\theta = r \nabla \Theta \quad (16)$$

By rewriting Eq. (13) in the new coordinate system, we obtain $$\frac{\partial}{r h_\xi h_\eta \partial \eta} \left( \frac{h_\xi F(s) Q_o}{2\pi CI(\Gamma)\varphi} \right) = \frac{\partial s}{\partial t} \quad (17)$$

And by introducing the circumference as $$CI(\Gamma) = \int_{\xi_0}^{\xi_1} h_\xi d\xi \quad (18)$$

If the scale factor of the streamline is independent of the flow path variable, by substitution of Eq. 17 into Eq. 16 the scale factor cancels from nominator and denominator and Eq. 13 reduces to $$\frac{\partial}{\partial \psi} \left( \frac{F(s)Q_o}{\varphi} \right) = \frac{\partial s}{\partial t} \text{ for } \xi \in [\xi_1, \xi_2] \eta \in R \quad (19)$$

$$\frac{F'(s)Q_o}{\varphi} \frac{\partial s}{\partial \psi} = \frac{\partial s}{\partial t} \quad (20)$$

$$\psi = \int r h_\xi h_\eta d\eta \quad (21)$$

where $\psi(r,z)$ is the spatial similarity variable, and $$\Delta \xi = \xi_1 - \xi_0 \quad (22)$$

Equation 19 is a hyperbolic equation, which is analogous to the classic Buckley-Leverett equation [5] or radial Buckley-Leverett equation [6]. As it is apparent in Eq (19), based on the relative permeabilities and initial conditions, solving for the evolution of the rarefaction waves is possible. In the other words, the possible solution for Eq (19) can be a smooth spectrum of saturation instead of an abrupt variation of saturation. From a physical point of view, because of the lower viscosity of gas, the Darcy velocity of gas is much higher than the liquid. Since the displacing fluid moves much faster than the displaced fluid, viscous fingering (the Taylor-Saffman instability) develops [7]. Evolution of the two-phase zone can be negligible in early time because of small length available, but it grows longer with time, reaching potentially hundreds of meters in several years.

Characteristic Isosat Position

In the simple geometries such as linear, radial or spherical cases with a single point source of injection and in the absence of gravity and capillarity, the isosat positions are trivially known. In the more complex and realistic cases applications like radial or point source injection in the presence of gravity, the positions of isosats are complicated and will change in time. To account for the vertical buoyancy force that arises because the GHG being injected is less dense that the saline liquid in the aquifer, a capillary force approach is necessary. Assuming linear relative permeabilities and J-Leverett functions does not limit the applicability of this analysis because linear permeability functions are physically reasonable assumptions when capillary pressure is small, in a typical coarse-grained porous medium that is a desirable sequestration target. Also, linear relative permeability functions were used in all other analytical solutions [1,2,3,4].

Based on the assumption of negligible vertical velocity, pressures arising are composed of the radial driving pressure and the gravity forces arising from the density differences and the height of the column:

$$P_w = P_w(r) - \gamma_w z \quad (24)$$

$$P_n = p_n(r) - \gamma_n z \quad (25)$$

And therefore for capillary pressure $$P_c = p_c(r) + \Delta\gamma z + C \tag{26}$$

And by using a linearized J-Leverett function $$P_c = \frac{\cos(\theta)J(s)}{\left(\frac{\varphi}{K}\right)^{1/2}} = j(s) = A(1-s) \tag{27}$$

By averaging over the aquifers thickness $$\left(\overline{T}_{(r)} = \frac{\int_0^H T_{(r,z)} dz}{H}\right)$$

$$\overline{P}_c = j(\overline{s}) \tag{28}$$

And from equation 26

$$\overline{P}_c = p_c(r) - \frac{\Delta\gamma H^2}{2} + C \tag{29}$$

$$P_c = j(\overline{s}) + \Delta\gamma z + C \tag{30}$$

Equation (30) is the global function based on r and z, and the saturations can be readily obtained. In order to finds, a radial Buckley-Leverett formulation can be used $$\overline{s} = \begin{cases} 0 & r < \sqrt{\frac{Q_o t}{m\pi\varphi}} \\ \frac{m}{m-1} - \frac{1}{m-1}\sqrt{\frac{mQ_o t}{r^2\pi\varphi}} & \sqrt{\frac{Q_o t}{m\pi\varphi}} < r < \sqrt{\frac{mQ_o t}{\pi\varphi}} \\ 1 & r > \sqrt{\frac{mQ_o t}{\pi\varphi}} \end{cases} \tag{31}$$

By substitution of Eq (31) in Eq (30)

$$P_c = \begin{cases} P_{cm} & r < \sqrt{\frac{Q_o t}{m\pi\varphi}} \\ \frac{P_{cm}}{m-1}\left(\sqrt{\frac{mQ_o t}{r^2\pi\varphi}} - 1\right) + \Delta\gamma z + C_s & \sqrt{\frac{Q_o t}{m\pi\varphi}} < r < \sqrt{\frac{mQ_o t}{\pi\varphi}} \\ 0 & r > \sqrt{\frac{mQ_o t}{\pi\varphi}} \end{cases} \tag{32}$$

In equation 32, C is the constant, which is different for different values of saturation (or $P_c$). In order to calculate the precise position of the isosat which represents $i^{th}$ saturation (i.e. any specified contour of equal saturation), a formulation for the transition zone is obtained from equation 19. Values of the constant C for the limiting cases of s=0 (pure liquid) and s=1 (pure GHG injected) are trivial, therefore the locations of these limits can be specified. The position of the isosats comes from Eq 32 and for each isosat, z increases with r; in other words, for each isosat, its minimum radius is located at the bottom of the sequestration zone at z=0 and the maximum radius is at the top at z=H. It is therefore reasonable to assume that the first isosat starts from $r_{min}$ when z=0 and the last isosat terminates at $r_{max}$ on the upper surface, at z=H. There is growing transition zone of saturation which linearly exands outward over time, and the limits of the transition zone (s=0 and s=1 define the limits) can be obtained from the above formulations and this equation.

$$1 - s = \begin{cases} 1 & r < r_{min} \\ \frac{1}{m-1}\left(\frac{r_{max}}{r} - 1\right) + \frac{\Delta\gamma}{P_{cm}}z + \frac{C_s}{P_{cm}} & r_{min} < r < r_{max} \\ 0 & r > r_{max} \end{cases} \tag{33}$$

Numerical Results

In order to demonstrate the capability of this approach, an example injection problem is solved. In this example, permeable sandstone which is confined by two horizontal impermeable formations on the top and bottom is modeled. The intrinsic permeability of the sandstone formation is 10 mD and the ratio of viscosities is 10. The J-Leverett function is linearized and is assumed to be $$j = 10\alpha\left(\frac{\varphi}{K}\right)^{1/2}(1-s) = P_{cm}(1-s) \tag{34}$$

In order to find the limits of the transition zone at two different times, $t=10^6$ and $t=10^8$ sec, the following physical parameters are stipulated to represent a realistic case.

TABLE 1

Characteristics of the porous layer and the pore fluids

| $Q_o$ (m³/s) | $\frac{\mu_w}{\mu_n}$ | K (m²) | H (m) | φ | Δγ (N/m³) |
|---|---|---|---|---|---|
| $10^{-4}$ | 10 | $10^{-14}$ | 30 | 0.1 | 5000 |

Self-similar behavior of the transition zone is shown in FIG. 1; the same behavior is repeated over time.

Simple linear relative permeability and linear capillary pressure functions can thus be used to model the effect of gravity during GHG injection into the porous layer. The novelty of this solution compared to aforementioned works is inclusion of the two-phase transition zone arising because of the lower viscosity of the injected GHG, leading to fingering and a growing two-phase zone that can reach hundreds of meters in radius.

Carbon Dioxide Sequestration Risks

In one aspect, the invention relates to a CCS process wherein risks are reduced, as set out in more detail below. The present example is based on the premise that sequestration will be implemented by super-critical CO2 injection into a saline aquifer. CO2-EOR is not in the remit, and nor is CO2 used to displace CH4 in coal seams or natural gas reservoirs.

The SC-CO2 Sequestration Process

1. Acquisition of CO2 and separation: short-term storage is needed at the separation site. Examples of CO2 sources where such separation and storage may occur include:
 a. Ammonia and methanol plants (pure $CO_2$)
 b. Other industrial processes that give a $CO_2$-rich gas for separation of pure $CO_2$ such as cement plants and other chemical processing plants c. New power cycles using improved coal combustion methods with pure oxygen or special processes giving high $CO_2$ content flue gas
d. Standard coal-fired power plants, bitumen upgrading facilities
2. Transportation of $CO_2$ (or SC-CO2) to the sequestration site is needed, and this involves
   a. Compression and dehydration of the $CO_2$
   b. Pipeline transmission network
   a. Potential need for short-haul transportation via tanker trucks
   b. Transportation on water ways via tankers
3. Sequestration site activities:
   a. Short-term storage of CO2 is needed at the sequestration site
   b. Drilling of wells and the design of these wells (cement type, quality control of cement job, depth of surface casing, security of the downhole tubing installation completion, etc.)
   c. Designing and implementing the injection process
      i. 50-year well life and integrity with $CO_2$ as the injectate
      ii. Pressure and temperature of injection
      iii. Limits on rates, p, T
   d. The response of the strata to injection
4. Post-sequestration residence
   a. Geo-risks, noting that CO2 dissolved in water is the safest practical sequestration alternative in the long-term
   b. Anthropogenic risks (man-made pathways, intersections with the sequestration formation)

Storage

An integrated industrial-scale project must have storage capacity at the production side (front-end of the transportation system) and at the use side (at the tail-end of the transportation system). The storage needed can be achieved by one or a combination of the following methods:
1. Use of pinnacle reefs or sandstone bodies (previous $CH_4$ reservoirs are excellent candidates) approximately 1 km deep as temporary storage sites for CO2, and choosing such sites to be secure against
   a. Leakage of CO2 into surrounding strata and possible flow toward the surface or valuable resources such as potable water aquifers
   b. Pressure limits or losses from such a storage facility
2. Caverns dissolved into salt beds (200,000-500,000 m³) from 1 to 2 km deep may be used as storage facilities for CO2, and design of such a facility must account for
   a. Security of salt caverns in terms of closure rates and salt behavior
   b. Maintaining casing integrity, cement integrity, etc.
3. Surface storage facilities under pressure can keep the $CO_2$ in supercritical state (p>8-10 MPa, depending on the purity of the CO2). The facility design must address the following issues
   a. Size, surface impact, risk of a breach ($CO_2$ is heavier than air)
   b. Steel behavior in presence of CO2 with cyclicity of pressures . . .

Monitoring

At all stages of the process above, until the point at which sequestration is achieved, there is great scope for monitoring of the process for the following reasons 1. HSE reasons (health-safety-environment)
2. Studying the physics of the process
3. Calibration of deterministic physics-based predictor models
4. Gathering experiential data to guide future projects
5. Quasi-real time optimization of the injection process
6. Satisfy regulatory requirements Once sequestration has been attained and the active injection is terminated, it is generally considered to be the end of the aggressive active monitoring, and thereafter, the level of monitoring will be greatly diminished. Nevertheless, some of the long-term metrics that could be gathered include:
1. Pressure decay and disappearance of any temperature or pressure anomaly
2. The physical distance of transmission of SC-CO2 to see how long lateral flow continues in the aquifer after injection
3. Ground deformation, remnant induced seismicity
4. Monitoring the integrity of individual wells GeoRisk There are risks associated with the sequestration of a material such as SC-$CO_2$—Super-Critical Carbon Dioxide—because of the properties of this material as long as it stays in a discrete non-dissolved state. The major risks arise because of these properties:
1. Low density: the density of SC-CO2 in the repository before dissolution will be about 0.72 g/cm³ maximum, and the surrounding water has a density of 1.05-1.20, so there will be a buoyant force for as long as there is SC-CO2 that is not dissolved in the water, and the higher the vertical continuous column of SC-$CO_2$, the greater the buoyancy forces.
2. Low viscosity: the viscosity of SC-CO2 is about $\frac{1}{10}^{th}$-$\frac{1}{20}^{th}$ the viscosity of water, so under a particular gradient, it will flow proportionately more rapidly in the pore system or in the natural fractures. Furthermore, injection of a low-viscosity agent leads to viscous fingering, which reduces storage capacity by direct volumetric displacement, but which exposes more surface area for dissolving into the aqueous phase.
3. Miscibility: water and oil are partially miscible in SC-CO2, in contrast with, for example, the solubility of oil in a gaseous phase (extremely small). This means that SC-CO2 has the potential to:
   a. Dehydrate shales
   b. Dehydrate porous media by displacement of the mobile water followed by evaporation of the remnant water, including water in natural fractures, so that the relative permeability to SC-CO2 is 100%, increasing the risks of CO2 transport through natural fractures or channels that breach the cap rock
   c. Carry dissolved materials along in transit
4. Acidity: As the CO2 dissolves in the water found in the ground, carbonic acid is generated, and the pH therefore becomes quite low (acidic), the specific value depending on pressure, saturation level and salinity of the water, but on the order of pH=3.5. This low pH means that acidic conditions prevail, as compared to standard conditions in sedimentary saline aquifers where pH may be in the range 6.0-7.5. Low pH means that carbonate minerals are easily dissolved, as well as potential acceleration of other geochemical interactions. Dissolution of minerals may increase risks by reducing the natural stresses or widening pathways for escape of CO2
5. Precipitates: If the chemical activity of the carbonic acid solution leads to the precipitation of minerals in situ, these minerals may affect the permeability of the rock mass, affecting the rate at which SC-CO2 can be injected.
6. Capillarity: A material such as CH4 in a reservoir is sealed in place in part by capillary barriers arising from the surface tension between phases. The buoyancy is counteracted by the capillary forces, and in fact these are in balance, but there is an upper limit to the capillary resistance that is due to the pore (fracture) diameter, and to the maintenance of a fixed surface tension. In the case of SC-CO2, it is not clear that the capillarity is sustained over indefinitely long time periods because of the partial miscibility of water and SC-CO2. The strength of capillary barriers remains unquantified in the SC-CO2-water system in porous media.

Trapping Mechanisms

Figure 2:
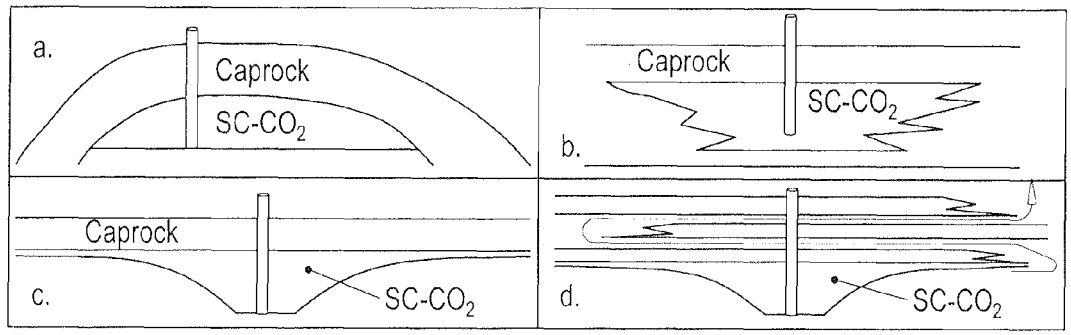
FIGS. 2A-D are schematic cross sectional views of formation showing different trap types as follows.

The long-term residence of SC-CO2 in the saline aquifer repository must be assured, so that sufficient time is allowed for the SC-CO2 to eventually all dissolve into the water, as the dissolved state is considered to be far safer than the SC-CO2 state, as the risk issues of buoyancy, viscosity and miscibility mentioned above have essentially disappeared. There are four geometries that should be considered as effective traps (FIG. 1):
1. Structural Trap: In this form of trap, the stratigraphic horizons have been gently bent, perhaps only a few degrees, and a porous saline aquifer is trapped beneath a suitable cap rock, which must be largely impermeable to SC-CO2. The trap is like an shallow upside-down bowl, and the buoyancy of the SC-CO2 means that it resides underneath the cap rock over long periods until it is all dissolved in the regional water (which likely continues to flow slowly at the regional scale).
2. Stratiaraphic Trap: A trap formed by a lateral change in rock type can be used for sequestration. A simple example of this is an ancient river channel that was cut into clayey strata. The different rock type surrounding the channel, generally a fine-grained rock such as a clay-rich silt or a shale, forms the seal, both vertically and laterally. Examples of stratigraphic traps are shown in FIG. 2.
3. Laterally Extensive Formation Trap: In the case of a laterally consistent rock type, where the cap rock is of great lateral extent, one may view the large-scale system as a trap because as SC-CO2 is injected, it spreads laterally under the cap rock and continues to spread slowly over such a large area that it dissolves into the water in the pores and no longer is a discrete phase. The dissolved state is slightly denser than the formation water, so once the SC-CO2 is totally dissolved, there is no buoyancy leading to a risk of breaching.
4. Lona Flow Path Trap: Similarly to the case above, if it can be shown that SC-CO2 flow can be assumed to take place with an extremely long flow path, or at a slow enough rate, then the risk of interacting with shallow waters (fresh aquifers) is very small because the CO2 will dissolve into the water during the long flow path transit. Another factor in this type of trap is that once the SC-CO2 rises to approximately 600-700 m depth, it will turn into a gaseous phase with different properties, and the forces of capillary blockage will be much more dependable and long-lived, resisting further upward movement, and reducing the permeability (i.e. the relative permeability to gas will be less that the relative permeability to the supercritical phase because water can dissolve into the supercritical phase).

Reservoir Management Issues

For a given repository site, the geology is fixed, but the development and sequestration scheme can be modified in various ways; the major ones are outlined here.
1. Project Geometry and Disposition: The project may use vertical wells or horizontal wells, and if horizontal wells are used, the length of the well will affect the injection capacity of the wellbore and the rate at which the saline aquifer can be accessed. The wells then must be spaced according to calculations of reservoir response, effective use of the available pore volume, the gradual pressure changes in the strata, and so on. Because of the low viscosity of SC-CO2, for example, relatively low permeability reservoirs can be used, and with long horizontal wells, there is little issue as to the capacity of the wellbore, as frictional resistance along the injection tubing and through the perforations will be modest.
2. Infection Pressures: The injection pressure is not a free parameter in that there will be a MOP (Maximum Operating Pressure) predicated by the permit from the regulatory agency. That being said, it is still possible to inject at pressures lower than the predicated value to meet various technical goals, although this may mean that individual wells are not necessarily operated at their maximum efficiency with respect to injection rate. In general, the injection rate will vary over the life of the project in order that the MOP is honored.
3. Infection Temperatures: Injection of fluids that are substantially colder or hotter than the rock mass will lead to stress changes from thermoelastic contraction or expansion, and these effects may increase or affect the risks of formation hydraulic fracturing or the formation of shearing surfaces that might have a deleterious impact on the reservoir performance. Injection temperature is a parameter than can be controlled to some degree, and whether or not it is necessary depends on calculations of the potential impact of these effects.
4. Control of Microseismic Events: Any time that fluids are injected into reservoirs, there is an increase in the number of small microseismic events (almost exclusively small shearing events). Although it is improbable that a large seismic event with negative consequences could be generated in a well-designed SC-CO2 sequestration project, it may in some cases prove expedient to adjust the injection parameters to control the magnitude and recurrence rate of the induced microseismicity. This is less likely in repositories that are far from tectonic features and that are not close to conditions of criticality with respect to earth stresses.

Anthropogenic Escape Paths

The favored sites for repositories in saline aquifers are found in sedimentary basins that generally are or have been targets for exploitation of oil or natural gas. This means that wells may already exist, and these wells penetrate the superincumbent strata in which the seals are located. Furthermore, the repository will be charged through injection from a number of wells that are purpose-drilled to serve as injection wells, or perhaps as monitor wells (old injection wells may be converted to monitor wells late in their life or at the end of the project).

1. New wells: The design of the wells, whether they are vertical wells in the reservoir or vertical wells that are turned horizontal to penetrate the reservoir, will involve a minimum of two casings, cemented fully to surface.
   a. The surface casing is installed to a depth of 150-250 m, or whatever depth is needed to isolate the shallow strata from the deeper drilling process. The surface casing should be cemented to surface with a cement that is resistant to CO2 or carbonic acid (there will be no SC-CO2 at these shallow depths).
   b. The injection casing is installed to the total depth of the well and cemented to the surface. The bottom of the well is then perforated with explosive devices to place from 50 to several hundred openings from 15 to 25 mm in diameter through the casing. These perforations allow access to the reservoir rock for injection.
   c. In the case of a horizontal well, the entire section from the toe of the horizontal portion to the surface is cased, cemented into place, and later perforated at selected locations.
   d. Alternatively, for a horizontal well, the injection casing may be stopped at the beginning of the horizontal section, cemented into place, and then the horizontal section is drilled and a liner is placed, usually uncemented, to provide a great deal of flow area access to the reservoir.
   e. Injection tubing between 70 and 130 mm diameter is installed in the well and isolated from the exterior casing by a packer above the injection interval. SC-CO2 is injected through the tubing only, never through the exterior casing.
2. Old Wells: The issues with old wells are twofold.
   a. The location of old wells may be unknown because of incomplete records, surveying error, and so on. In the extreme case, there may be a number of old wells that were drilled into the repository horizon without any records, so their existence may not even be recognized.
   b. Even if the locations of all old wells are known, there is uncertainty as to the quality of the abandonment procedure that was used when these wells were closed.
      i. If the well was an exploration well, the company did not install production casing, but likely placed a number of cement plugs along the wellbore before cutting off the surface casing and welding on a plate.
      ii. It the well was a production well, it had a casing installed to the hole bottom, but it is not certain if the well was properly cemented, and the cement was pumped until it appeared at the surface. Various jurisdictions had (and may still have) different criteria for such wells in terms of the depth to the base of surface casing, whether the entire production casing had to be cemented to surface, etc.
      iii. A major gas leakage path, albeit a slow path, is known to be outside the casing[1], and well abandonment generally has, in the past, been limited to placing cement plugs within the casing, not perforating and blocking the outside of the casing. The current condition of the cement and the condition of the steel casing may be unknown, even if the well location is well-known.

[1] Dusseault M B, Gray M N, Nawrocki P A 2000. Why oilwells leak: cement behavior and long-term consequences. SPE Int. Oil and Gas Exhibition, Beijing, SPE #64733.

3. All Wells: The nature of the reactions between the SC-CO2 (or weak carbonic acid) and the steel casing as well as with the cement installed to seal the casing are relatively well-known. Steel and standard cementitious agents are gradually corroded by the presence of acidic carbonic acid, and the time scale of these processes remains of concern. These concerns apply to all wells, old and new.

GeoRisk Flow Paths

Because the integrity of the repository is paramount to reduction of risk of large amounts of CO2 escaping, the geological risks (GeoRisks) may be enumerated and evaluated. There are two types of such risks:
   A. There are risks that are inherent to the existing geological properties of the superincumbent strata and the stratigraphic disposition of the different beds.
   B. There are risks that arise over time through the interaction of the SC-CO2 or its products (weak carbonic acid) with the natural strata in place.

Inherent GeoRisks

The following list of inherent GeoRisks is not necessarily exhaustive, but the major issues are included.
1. Low-Integrity Caprock: The caprock may have natural fractures or other small-scale features that have not been adequately characterized that could lead to escape of low-viscosity, buoyant SC-CO2 from the repository at rates not foreseen in the planning. If this is the case, then the length of the flow path and the presence of additional seals become important considerations in the issue of integrity.
2. Non-Sealing Faults: These are features, generally at a high angle of inclination, that involve vertical or lateral displacement of the strata in the geological past such that a permeable plane has been generated through which fluids can flow. (A sealing fault is a fault that exists, but where it can be demonstrated that the fault plane does not constitute a flow path that can lead to the escape of fluids. Faults that pass through salt or highly ductile shales are usually sealing faults. Faults that pass through low-permeability limestones or siltstones are more commonly non-sealing faults. As above, if the fault allows breaching of the primary seal, other seals and flow path length arise.
3. Unduly Short Escape Path: The SC-CO2 injected at depth has inherent buoyancy and this will remain until such time that all of the SC-CO2 has dissolved in the aqueous phase. If the geological flow path length between the repository and a possible breach to surface, to a shallow depth where the CO2 will become a gas with a much larger volume, or could intersect a conduit to surface (e.g. an unsealed well) is short, there will be insufficient contact with water to allow full dissolving into the water phase.
4. Insufficient Volume, other issues: Proper site selection should be adequate to guarantee that there is sufficient pore volume for the project, that the permeability is in the correct range, that the heterogeneity of material parameters is known, and so on. In any case, these additional issues can be relatively easily managed during the project, and the early data collection phase would identify these issues quickly because of unexpectedly low injection rate potential, rapid pressure buildup, anomalous seismicity, and other effects.

Induced GeoRisks

The following list of induced GeoRisks includes known or possible effects associated with the interaction of the SC-CO2 or its products with the rock mass (seals, caprocks or reservoir), changing the properties or in situ conditions in manners that may not be favorable to maintenance of integrity. One of the issues with seal impairment that is poorly understood is the process of vertical hydraulic fracturing that may occur if the pressure exceeds the horizontal stress in the caprock—$p > \sigma_{hmin}$ ($=\sigma_3$). If this condition is created by any process, it will tend to be self-reinforcing because the buoyancy of the SC-CO2 provides at upward unbalanced force that aids in the further upward propagation of the vertical crack. Furthermore, the volume of a crack is modest compared to the volumes of SC-CO2 that will be placed in any repository, therefore a crack that propagates upward and moves toward the surface strata in a short time represents a major integrity loss as it is a direct pathway with little exposure to water for dissolution of SC-CO2.

1. Reactions with Ductile Shale Caprock: CO2, because of its polarity, has a sufficient affinity for the surface of silicate minerals such as clay minerals that it will at least partially displace the water from the clay if it is in full contact (i.e. not just as CO2 dissolved in water). If CO2 displaces water, there are not as many layers of electrostatically attracted CO2, thus there is a potential loss of volume (shrinkage). If the shale is a high porosity (porosity>15%) ductile shale, the shrinkage can be enough to cause a loss of horizontal stress ($\sigma_h \downarrow$) until the hydraulic fracturing condition is reached at the base of the shale caprock ($p > \sigma_{hmin}$) and a crack opens. Now, SC-CO2 is contacting the ductile shale higher up, the dehydration and shrinkage continues, and the greater height of the SC-CO2 column gives a higher unbalanced buoyancy-related driving force, all of which combine to give a slowly upward propagating, self-reinforcing fracture growth. If there are non-shale seals higher up (e.g. salt, low-porosity siltstone) or another potential repository that can accommodate the leaking SC-CO2, then risks of flight are greatly diminished. The concept of multiple barriers is vital to a secure repository.

2. Deterioration of Capillary Seals: A gas such as N2 or CH4 in a reservoir is also buoyant, in fact, far more so than SC-CO2. However, water is not soluble in such gases. If there are small diameter pore throats (e.g. siltstone without clay) or natural fractures of very small aperture, a surface-tension stabilized meniscus is formed, and a significant pressure is required to break this meniscus. This is the capillary blockage effect. Water is partially miscible with SC-CO2, therefore such capillary effects should deteriorate over time, and the long-term existence of a capillary barrier may not be assumed.

3. Dissolution of Minerals: The acidic condition of water saturated with dissolved CO2 means that sensitive minerals, generally carbonate minerals, will dissolve. There are several effects.
    a. Loss of $\sigma_h$: The loss of lateral stress if there is a significant volume shrinkage (1% would be sufficient) can lead to the hydraulic fracture condition, described above.
    b. Permeability increase: An increase of permeability in a seal or caprock can take place if the carbonate mineral phase is dissolved, such as, for example, might happen in a marl seal (a $CaCO_3$-rich fine-grained clayey rock).
    c. Fracture aperture growth: If there is substantial flow of acidified water through minute cracks in a $CaCO_3$-rich caprock, the fracture would widen with time through dissolution, and the potential flow rate through a fracture is a cubic function of the aperture, if the pressure gradient stays constant. This widens the flow paths so that a growing flow capacity is generated 4. Precipitation of Minerals: In some conditions, there may be geochemical reactions that lead to precipitation of minerals from aqueous solutions that are saturated with such minerals, when exposed to SC-CO2. If such precipitation occurs in the near-wellbore environment, permeability will drop, and the quality of the injection well will be impaired. Although it is generally thought that this is unlikely, the geochemistry of the reactions must be understood in the choice of repository.

5. Interaction with Oil: Oil is miscible with SC-CO2, and indeed this is a basic reason why SC-CO2 is an excellent Enhanced Oil Recovery (EOR) agent; the SC-CO2-oil mixture is of much lower viscosity and can flow through the pores more readily. Continued circulation of SC-CO2 strips the formation of the oil. Two issues arise: potential carrying of contaminants toward the surface, and blockage of porosity, thus impairing permeability.
    a. Carrying contaminants: This may happen at the depths where SC-CO2 is stable, but as such a mixture with oil rises toward the surface, the pressure is less, and the SC-CO2 will evolve as a gas, phase segregation will occur, and the denser oil will be left behind at depths of 700-400 m (the pressure range for the phase change) and the gaseous CO2, which cannot dissolve oil, will rise and become partially dissolved in the aqueous phase.
    b. Blockage: Many oils contain appreciable quantities of asphaltenes, particularly but not exclusively the highly viscous, high-molecular weight oils such as Alberta heavy oil and bitumen. As SC-CO2 mixes with an oil, the asphaltenes phase is precipitated as a gummy semi-solid that may impair the porosity in the repository, impairing the efficacy of the injection well.

6. Height of ReDosity and Buoyancy: The unbalanced driving force at the top of a column of SC-CO2 is the buoyancy force, and it generates a pressure that is greater than the pore pressure in the surrounding rocks (hence it remains unbalanced). The role of the caprock and seals is to contain this unbalanced condition until such time as the SC-CO2 has disappeared through dissolution into the aqueous phase or has generated precipitated minerals, and so on. If a repository (particularly a structural trap) has a substantial height, the unbalanced pressure at the top is $\Delta p = (\rho_w - \rho_{CO2}) \cdot g \cdot H$, the difference on the fluid densities multiplied by the gravitational acceleration multiplied by the height of the column —H. Thus, the greater the height of the column of SC-CO2, the greater the buoyancy force at the top of the column. This increases the risk of flow because the local gradients are much higher, and it increases the risk of hydraulic fracture because the pressure at the top of the column is closer to the horizontal stress.

Figure 3:
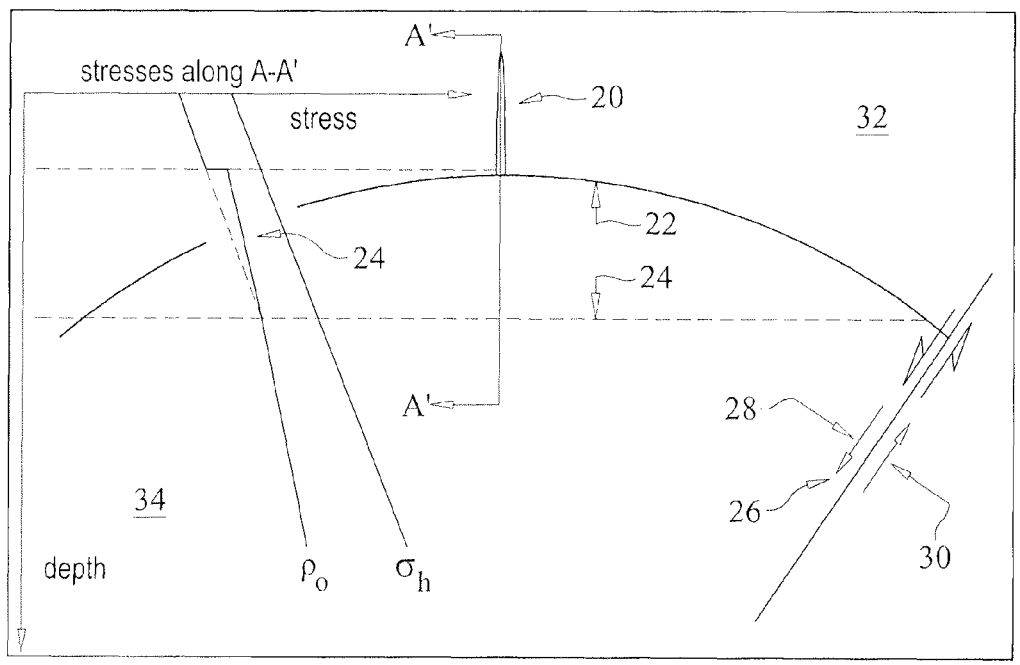
FIG. 3 is a schematic cross section of a formation showing the effect of a lower-density fluid residing at the top of a trap.

FIG. 3 illustrates the Buoyancy Effect wherein the larger the thickness of the SC-CO2 cap, the greater the buoyancy-sourced imbalanced pressure. Also, an increase in pressure can trigger shear faulting in exceptional cases. FIG. 3 shows the effect of a that a lower-density fluid residing at the top of a trap alters the pressure distributions, increasing the pressure in the lower-density fluid from the natural hydrostatic pressure, increasing the risk of breaching by fracturing at the top, or increasing the risk of triggering fault movement.

GeoRisk

Geological Lithological Seals

Various sedimentary rock types are encountered in regions of potential sequestration, at appropriate depths. Sandstones and limestones cannot be considered regional or local seals because sandstones are porous and permeable, and limestones are almost invariably naturally fractured. Seals are generally considered to be the fine-grained strata (shale, clayey siltstones, or fine-grained sandstones with high clay contents) or the low permeability strata (salt, anhydrite), providing that they are not naturally fractured (or that the natural fractures are closed and infrequent).

Sharp curvature structural traps may also be of questionable integrity because significant fracturing usually accompanies the deformation associated with bending of the rock units (rocks are generally brittle, with the exception of salt). Shales and siltstones that are unequivocally seals in flat-lying conditions must be examined carefully if there is sharp curvature folding. On the other hand, if an anticlinal fold is very gentle, several degrees dip on the closure flanks for example, the degree of tectonically-induced fracturing may be small or even inconsequential. For these reasons, intensely folded tectonic areas, such as the region of the foothills of Alberta, are not considered as suitable regions for large-volume repositories.

Similarly, as an example, there are concerns about the viability of large-volume SC-CO2 repositories in Ontario because the maximum depths of burial are on the order of 1 km, and the overburden non-salt rocks tend to be fractured. Also, the depth of the salt beds, potentially good caprocks, is at the shallow margin for phase stability for SC-CO2-700-850 m in depth (>1 km depth is considered necessary for phase stability).

Figure 4:
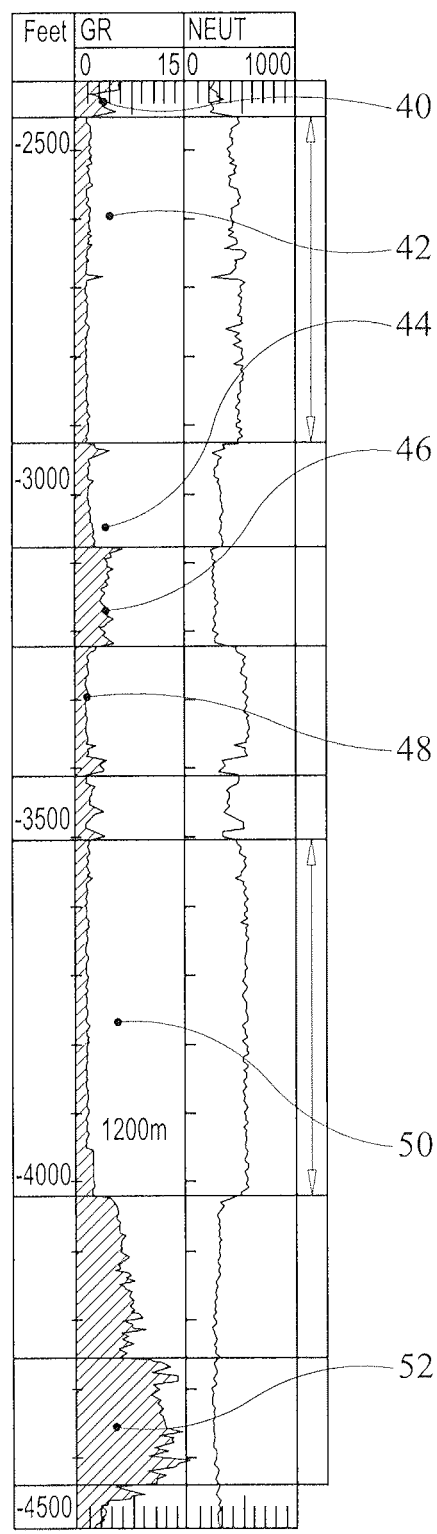
FIG. 4 is a schematic cross section of a formation consisting of repository Site located 300 km NE of Edmonton, Alberta, Canada.

The discussion will be limited to three types of sealing lithologies: shale, clayey siltstones and salt.
1. Shale: Low porosity unfractured shales (or very weakly fractured shales where the fractures are closed) are good seals and good caprocks. However, the following conditions for shale are negative indicators:
   a. High frequency of natural fractures: Escape paths may exist.
   b. High water content: Shrinkage of cap rock may occur
   c. High $CaCO_3$ content: Reactions with acidified formation water.
2. Clayey Siltstone: An ideal caprock is a quartzose silt (grain size typically of 10-50 μm) that is frame supported by the quartz grains, with 5-20% clay minerals that reduce the permeability to low values. If the siltstone is frame-supported, even alterations to the clay minerals will not significantly deteriorate the sealing qualities of the rock. As with any rock the presence of too many natural fractures is a negative indicator. Also, in some environments, the horizontal stress may be quite low, so that the risk of vertical hydraulic fracturing is increased.
3. Salt: Salt (NaCl) is perhaps the ideal caprock to contain SC-CO2 for three reasons: it has a vanishingly small permeability, it is non-reactive with SC-CO2, and it has a viscous response to unbalanced stresses. At depths of 1 km or more, salt flows slowly under differential stress so that the horizontal stress is equal to the vertical stress, which is a good condition to counter the possibility of vertical hydraulic fracture initiation and propagation. Also, this stress condition and the viscosity of salt act to blunt any propagating flaw that may develop in the underlying non-salt strata, preventing its upward propagation more effectively than other, more brittle geological strata.
4. Multiple Barriers: FIG. 4 shows an exceptionally secure lithostratigraphic sequence in eastern Alberta, approximately 300 km NE of Edmonton. The depth is adequate for placement of SC-CO2, and the securing is exceptional for a number of reasons:
   a. Flat-lying continuous strata: There are no significant faults or folds in the sequence. The strata all have great lateral continuity.
   b. Multiple barriers of salt: Salt is an excellent seal, and there are three separate continuous salt beds of great lateral extent, in all directions
   c. Other barriers: In addition to salts, there are salt-occluded sediments (very low k) and clayey silts of low permeability.
   d. Flow path length: The great lateral continuity and integrity of the seals means that the path length for escape is 100's of km long, and there will be exposure of the SC-CO2 to water along The formation depicted in FIG. 4 is the Watt Mountain Formation comprising an upper layer 40 of shale and sandstones. Underlying this is a layer 42 of Prairie Salt (k≈0) comprising the Prairie Evaporite Formation which comprises halite, carnallite and sylvite of various hues and degrees of crystallinity, but predominately red and moderately coarsely crystalline. Locally blue halite is present. Seams of red and grey dolomitic mudstone and some anhydrite beds are present. Underlying this is the Keg River layer 44 (shaley, low k), with the Keg River Formation consisting of Grey and brown dolomite with poor intercrystalline or vuggy porosity, and brown, cryptocrystalline, slightly argillaceous and fossliferous, dense limestone. Bituminous partings can be common. Fossils may make up to 10 to 30% of the framework. The next underlying layer is the Chinchaga Fmn Anhydrite 46, with the Chinchaga Formation consisting of Anhydrite and cryptocrystalline dolomite underlain by quartz sandstone with argillaceous and anhydritic cement. No fossils have been found in the unit.

The Cold Lake Salt layer 48 comprises the Cold Lake Formation, consisting of Halite, with thin basal red calcareous to dolomitic shale. Ernestina Lake Formation underlies this with Red shale at base, followed by a middle carbonate and an upper anhydrite, wherein the porosity is commonly salt plugged.

The next underlying layer in FIG. 4 is the Lotsberg Salt layer 50 comprising 160 m of pure salt. The Lotsberg Formation is almost pure halite. More commonly thin beds of red and green calcareous shale occur and, in the centre of the basin a red shale unit ranging from 30 to 60 m (100 to 200 ft) separates the salt sequence into two units. Basal Red Beds underlie layer 50 and comprise brick red dolomitic or calcareous silty shales, grading downwards through red sandy shale into greenish grew fine to coarse grained quartzose sandstone.

Underlying the above layers in FIG. 4 are Repository Strata 52 comprising the Earlie Formation, which consists of Interbedded glauconitic siltstones and fine grained sandstones and shales.

Figure 5:
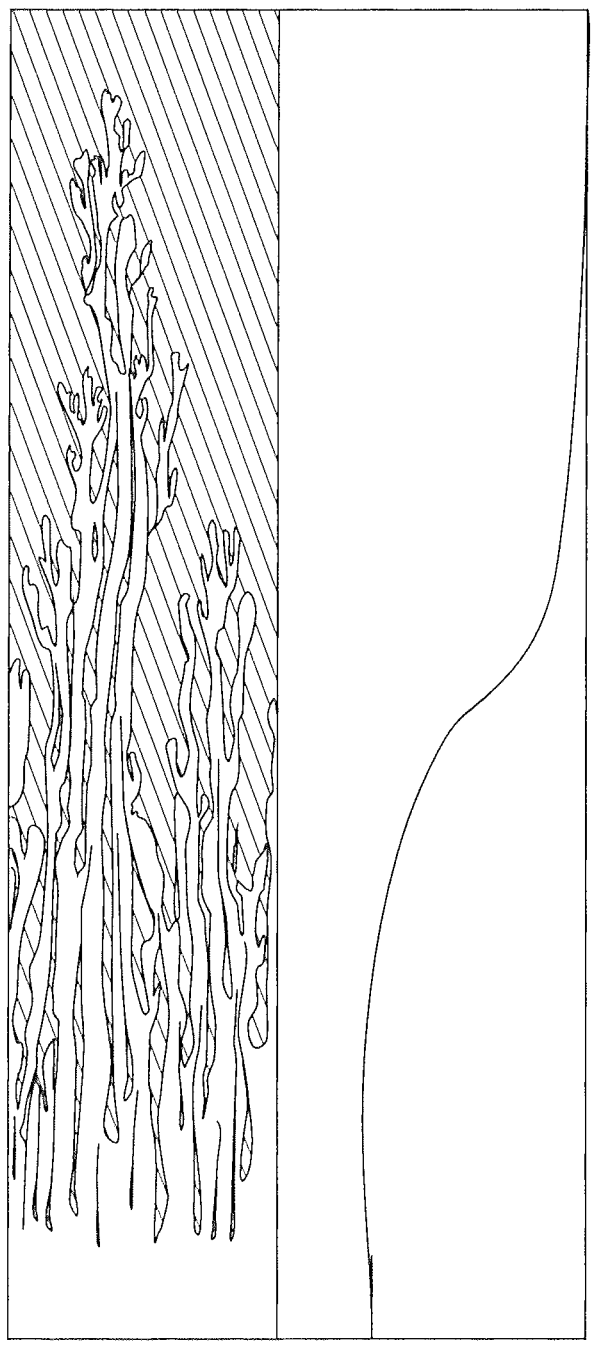
FIG. 5 is a schematic view of a formation showing viscous fingering occurring within the formation.

FIG. 5 is a schematic drawing of viscous "fingering" that occurs within a formation in the course of a CO2 sequestration process according to the invention. FIG. 5 also depicts the evolution over time of viscous fingering within a formation following the episodic injection process described herein (alternating GHG and waste water injection).

Figure 6:
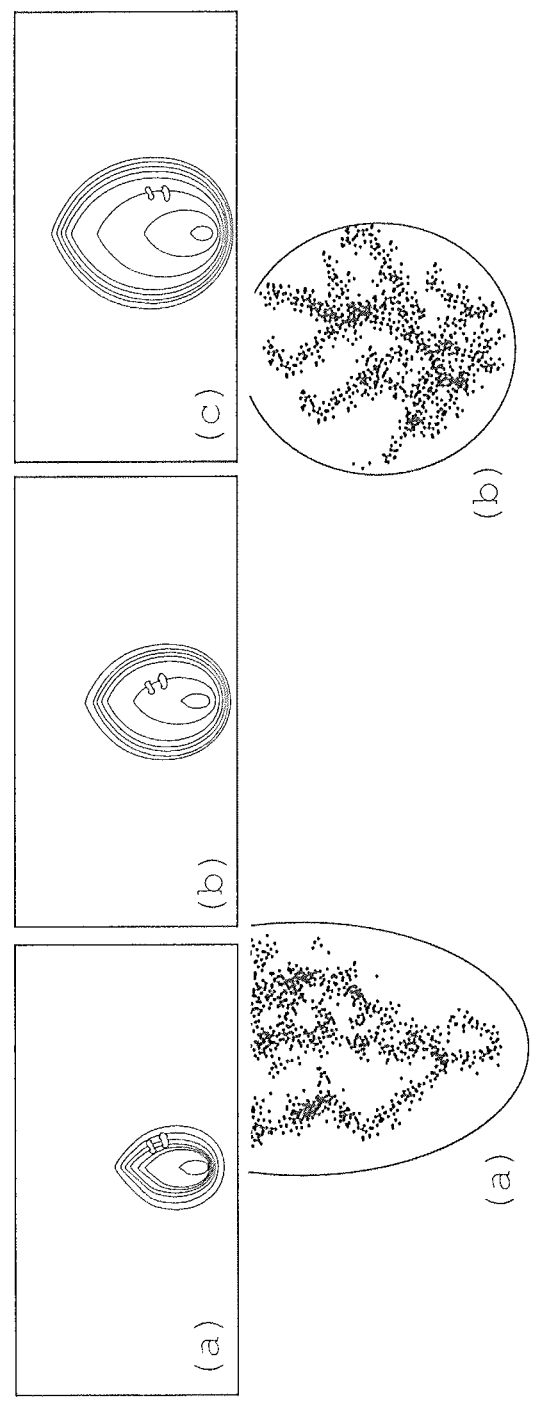
FIGS. 6A-C are schematic views of a formation showing the effect of viscous and gravity forces within the formation.

FIG. 6 schematically depicts the effect of viscous and gravity forces within the formation.

Figure 7:
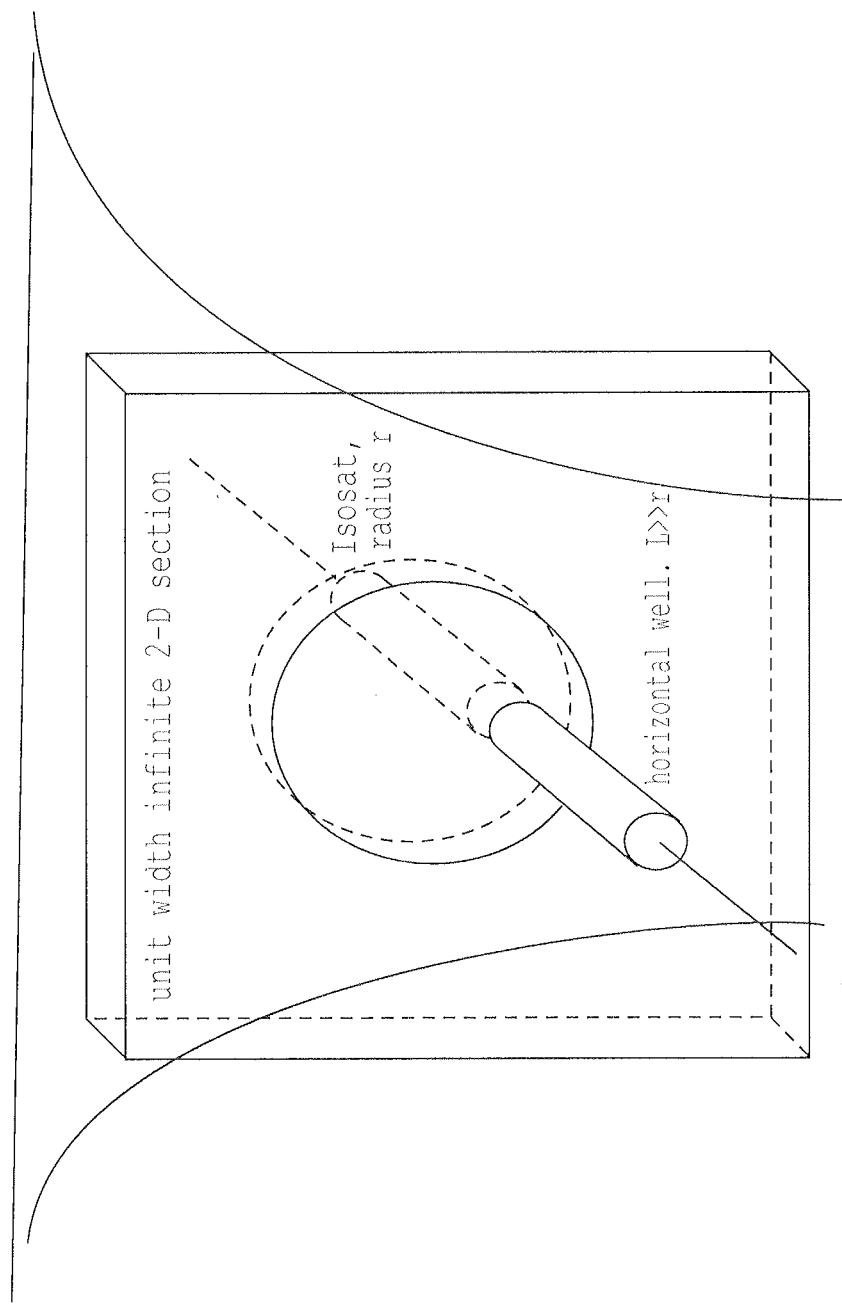
FIG. 7 is a schematic view of a formation showing the location of an isosat within the formation.

FIG. 7 schematically depicts the location of an isosat in the near term (short duration) period following the cyclic injection process described herein.

Figure 8:
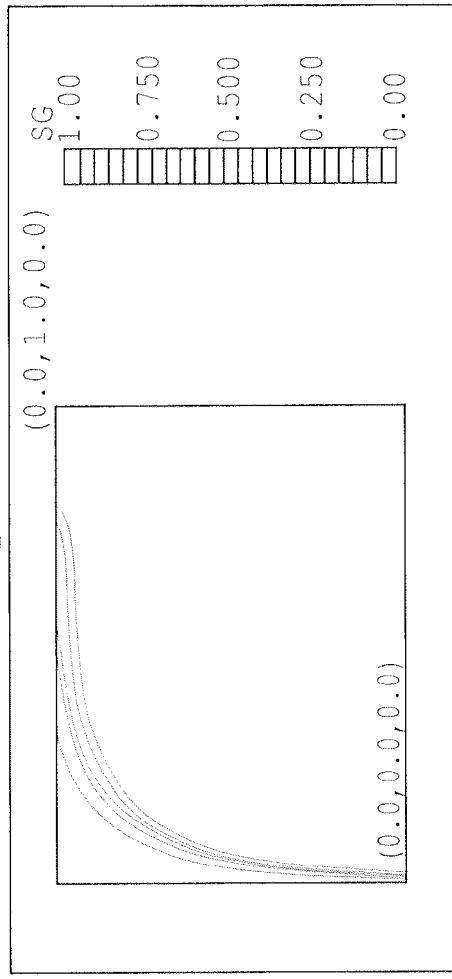
FIG. 8 is a graph that schematically depicts the sequestration of an enriched CO2 gas stream according to the present method.
Figure 8:
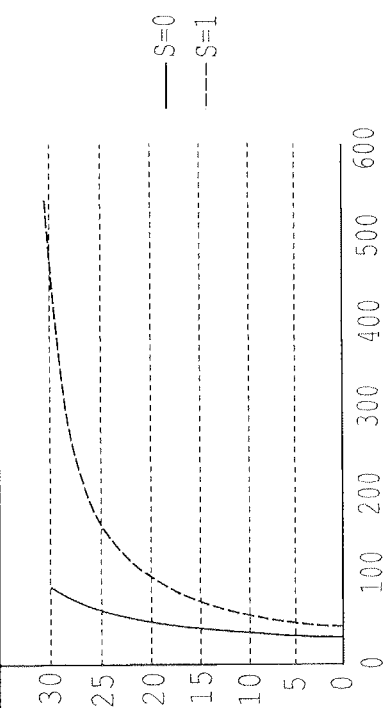
Figure 9:
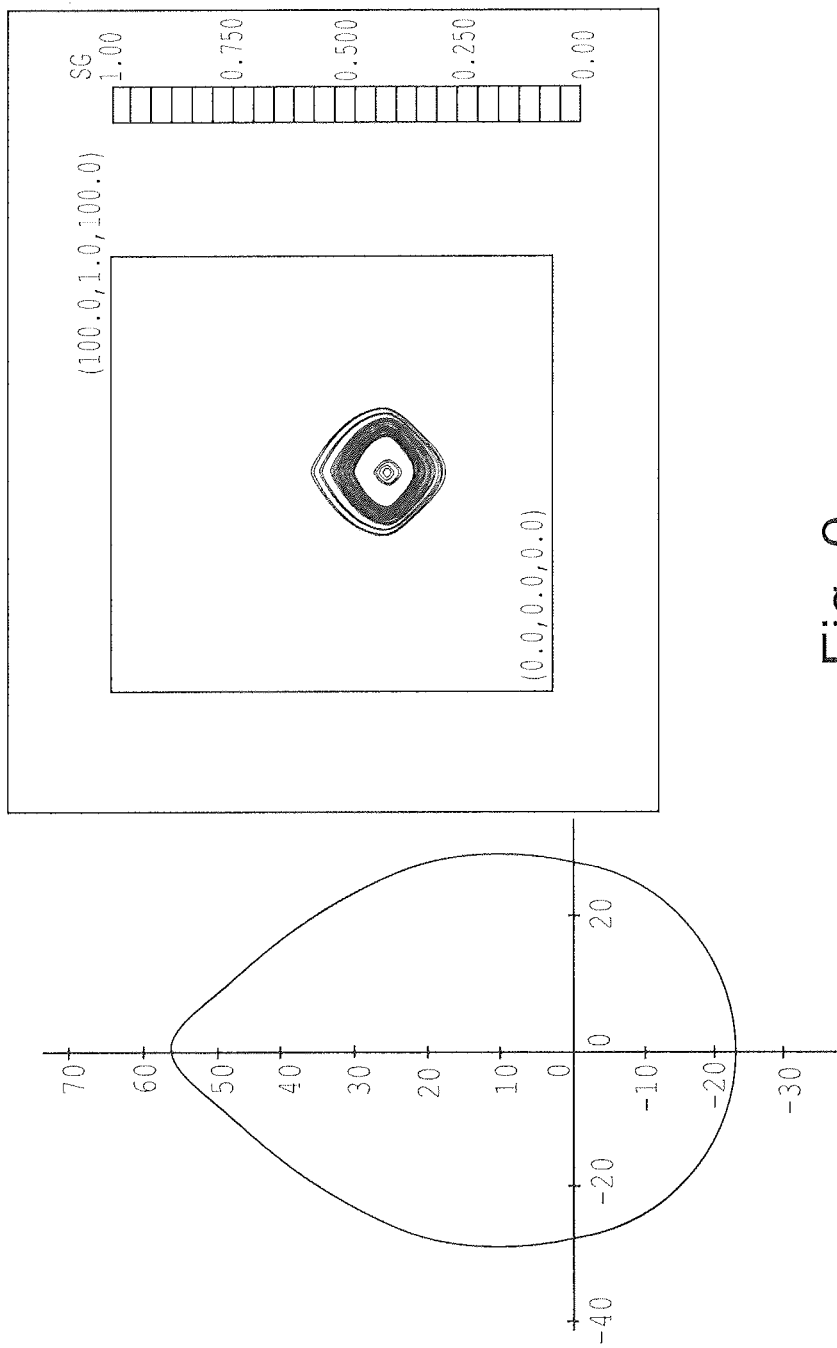
FIG. 9 is a further graph that schematically depicts the sequestration of an enriched CO2 gas stream according to the present method.

FIGS. 8 and 9 schematically depict the sequestration of an enriched CO2 gas stream according to the present method.

Figure 10A:
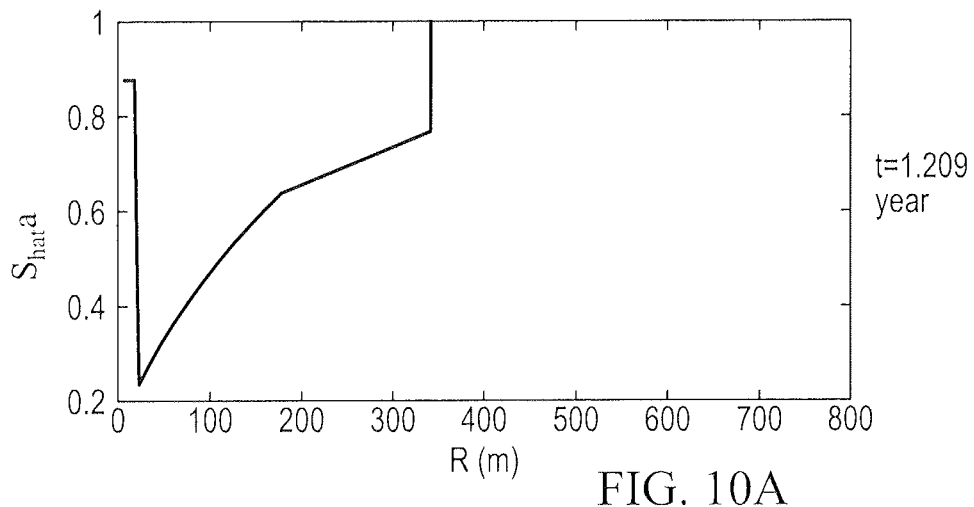
FIGS. 10A-F are graphs showing the results of mathematical modeling of solubility trapping of CO2 within a formation.
Figure 10B:
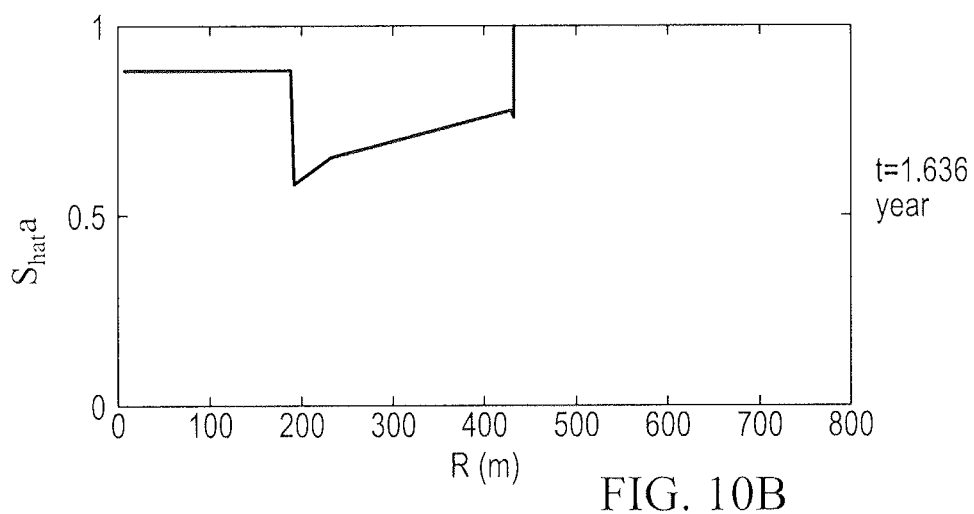
Figure 10C:
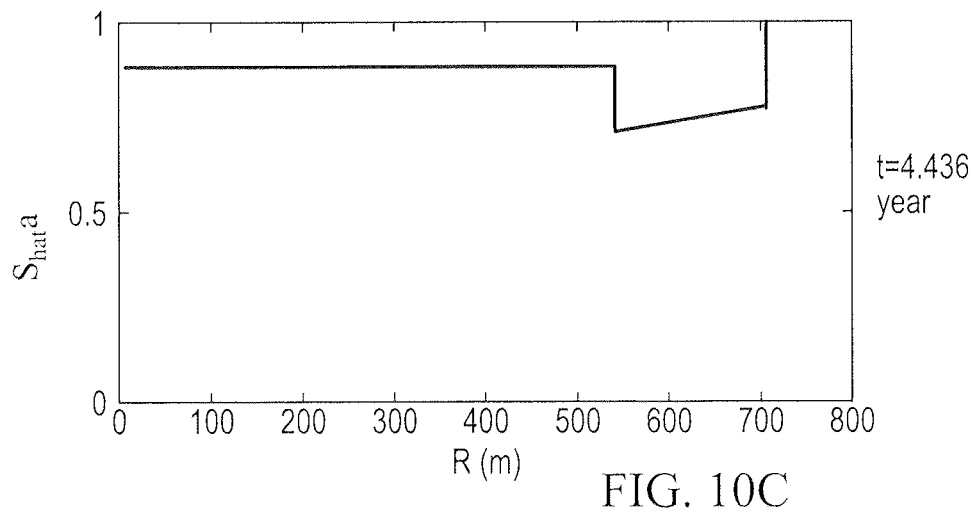
Figure 10D:
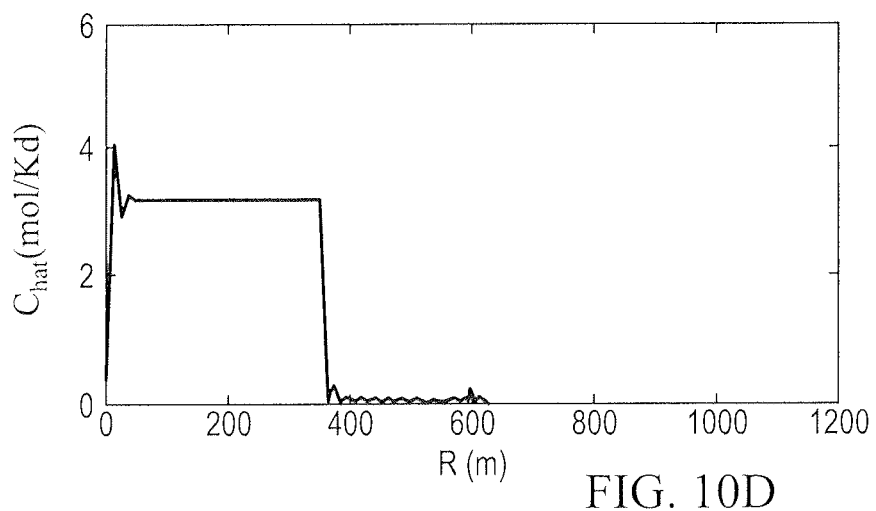
Figure 10E:
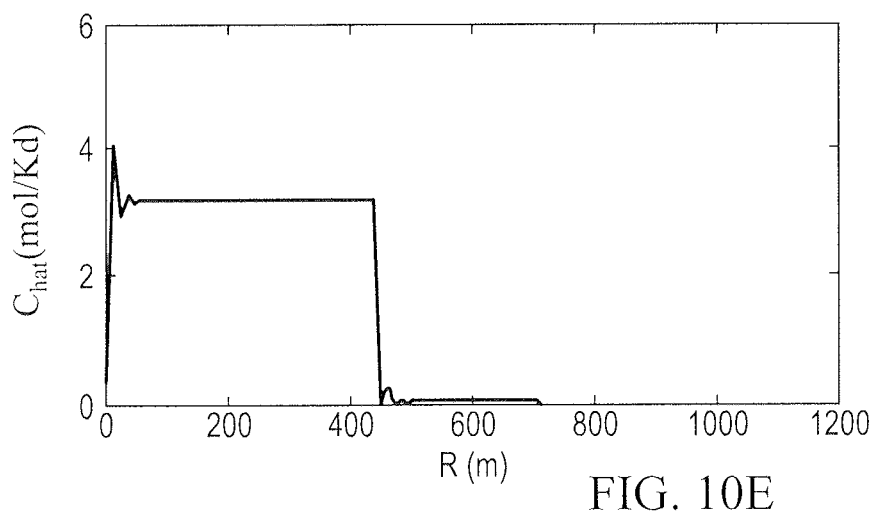
Figure 10F:
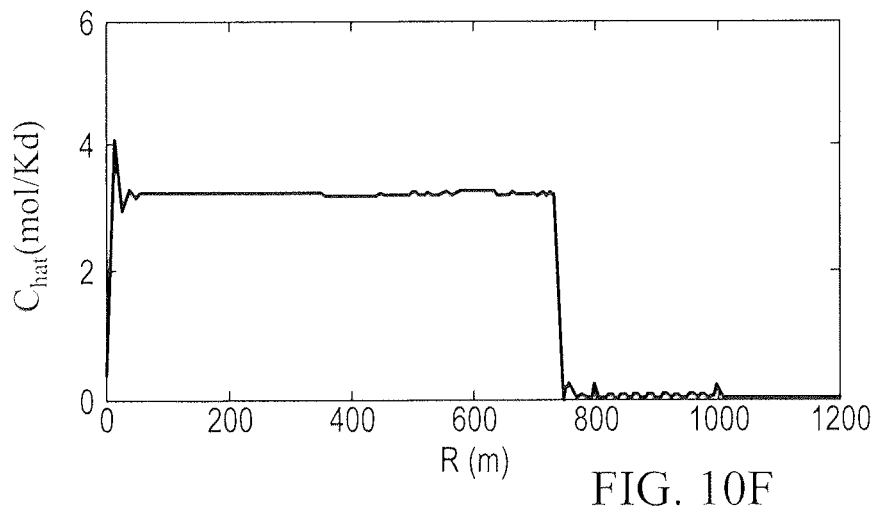

FIGS. 10A-F are a series of graphs showing the results of mathematical modeling of solubility trapping of CO2 within a formation at times of 1.209 years, 1.636 years and 4.36 years. FIGS. 10A-C show the spatial distribution within a formation of CO2 of saturation levels following cyclical injection of gas and water phases. FIGS. 10D-F show similar results for CO2 concentration levels within the formation. FIGS. 10A-F depict saturation (10A-C) and concentration (10D-F) during secondary imbibitions, boundary condition for concentration is c=0. Concentration of CO2 reaches to its equilibrium value fast enough to make the effect of kinetic mass transfer negligible. Additionally, FIGS. 10D-F represent the limited effect of diffusion; however, mechanical dispersion is not included in this model.

Figure 11A:
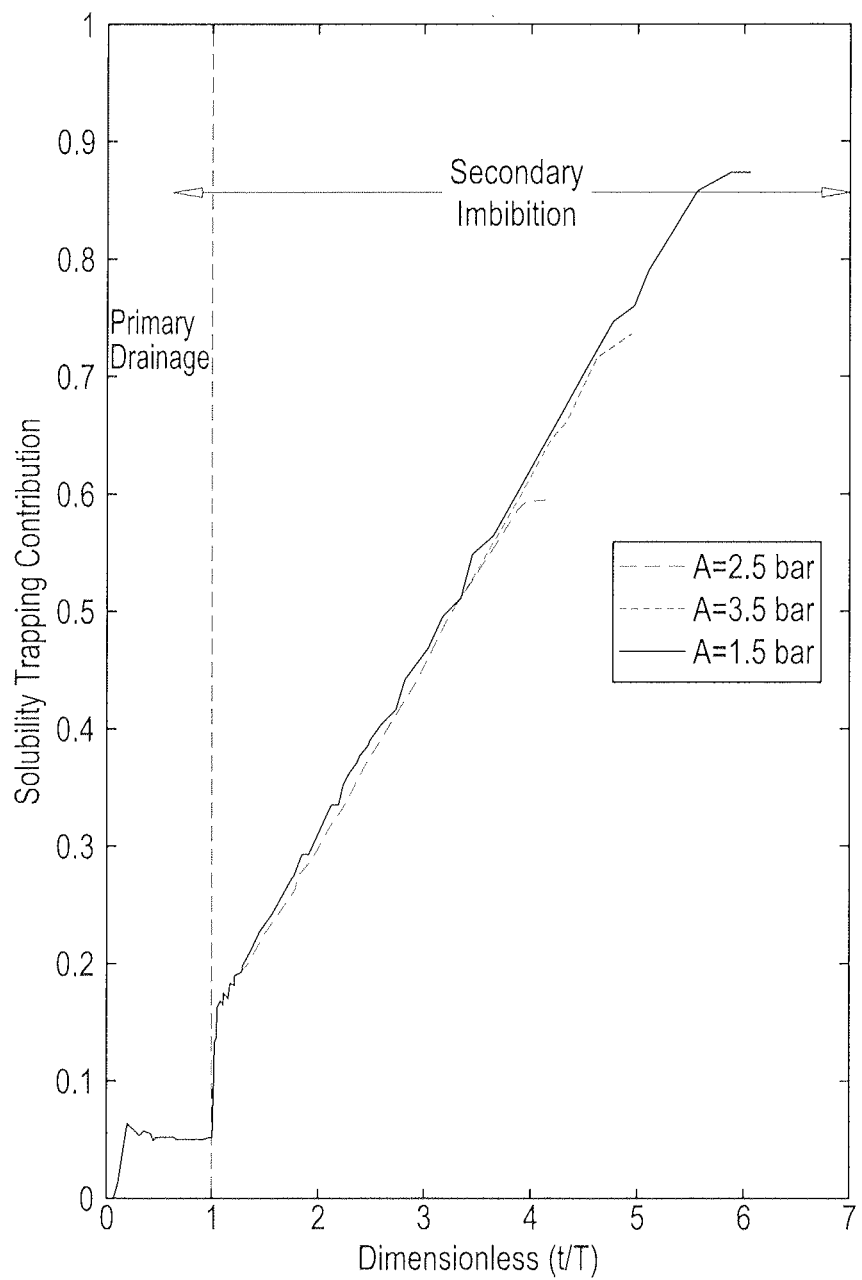
FIGS. 11A and 11B are graphs showing the results of mathematical modeling of solubility trapping of CO2 within a formation.
Figure 11B:
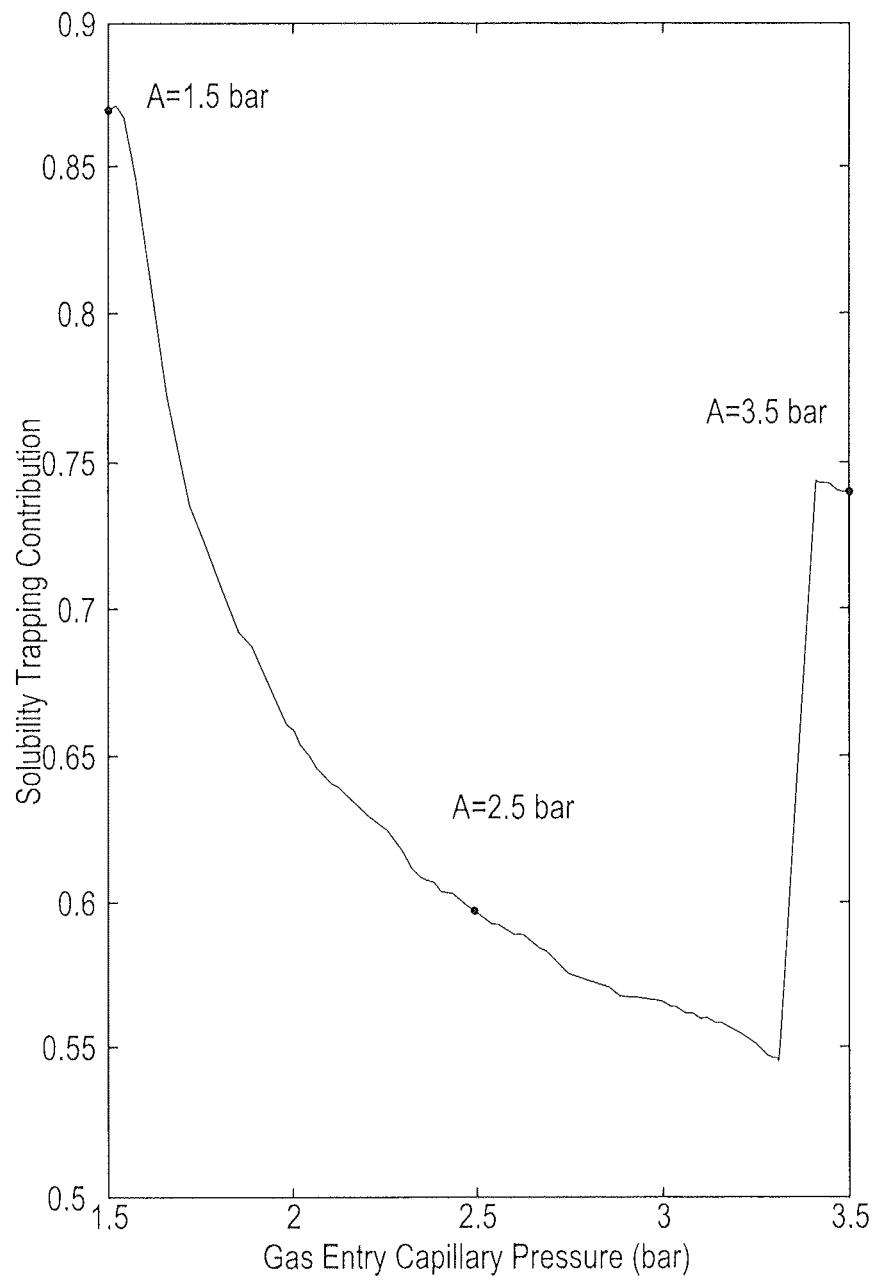

FIGS. 11A and 11B are graphs showing the results of mathematical modeling of solubility trapping of CO2 within a formation, showing the contribution of solubility trapping over time within the formation for different values of capillary pressures ("A") within the formation. Smaller values of A result in larger maximum breakthrough levels of injected gas and consequently the sweeping process (i.e. drainage) is more effective. The contribution of solubility trapping is larger after the completion of the secondary imbibition stage, namely after the water phase injected into the formation has been imbibed into the formation.

Episodic injection of CO2 into a water-saturated saline aquifer enhances the amount of CO2 that can be dissolved into the water phase in a reasonable time period. Current experiments injecting supercritical CO2 into saline aquifers are plagued with excessively long time periods before the CO2 becomes dissolved in the water; periods as long as 5,000-10,000 years have been suggested in order to achieve 95% dissolution. As long as substantial volumes of free CO2 remain in the aquifer, risks of uncontrolled escape remain; however, once fully dissolved in the water phase, the risks of escape become extremely small in comparison. Episodic alternating CO2 and water injection will accelerate the dissolution process so that 95% dissolution can be achieved in a matter of years, not millennia.

In one aspect of the invention, the gas phase injected in the first stage invades pores within the formation and effectively "drains" these of any fluid therein (hence a "primary drainage" step). In the second stage of water injection, the injected water "recaptures" the invaded pores and recharges these with water. A capillary effect within the formation causes the transition zone to grow in width and cyclic injection of water accelerates mixing and facilitates dissolution of the CO2 into the water. In addition to the enhancement of solubility trapping, after the reinjection of the water a trail of gas remains at its residual saturation level if the surrounding water is fully saturated with CO2.

Example 1

Example 1 is a method for determining the period and frequency of injection. In this example, a simplified version of the governing equation is used. It is possible to use a more complete equation with refined mathematical calculations to determine the injection period parameters.

In this example, the ultimate mass ratio of CO2-water is approximately 1:20, based only on the solubility of CO2 in water under typical pressures and temperatures at depths of 1-2 km (pressure range 10-20 MPa and temperature range 35-55° C.), and assuming that the goal is to achieve an aqueous phase that is fully saturated with CO2 under the in situ conditions.

In one embodiment, the CO2/water mass ratios can be from about 1:20 (equivalent to the saturation level of about 5%) to about 1:100. In the latter case, achieving full dissolving of the CO2 phase into the water phase will be far more rapid, although the total mass of CO2 dissolved per unit mass of water will be lower. In other embodiments, the CO2/water mass ratio is from about 1:20 to 1:40 or from about 1:20 to 1:30. In another embodiment, in order to achieve the desired condition of full dissolution of the CO2 into the water phase, the CO2/water mass ratio should be approximately 1:20.

A CO2 injection project will have a stipulated maximum allowed pressure of injection set by consideration of the risks associated with high injection pressure, such as CO2 escape outside the steel-casing, hydraulic fracturing of the sealing strata, or the risks of escape through excessive flow rates through flow paths such as naturally existing fractures. This maximum pressure will be set by regulatory agencies.

During injection, a constant rate of injection may be used, and this rate will be calculated from the maximum pressure permitted. Assuming a constant rate of injection:

$$S_{(r)} = \frac{m}{m-1} - \frac{1}{m-1}\sqrt{\frac{mQ_o t}{r^2 \pi \varphi}} \quad r_w < r < r_{max} \tag{1}$$

$$r_{max} = \sqrt{\frac{mQ_o t}{\pi \varphi}} \tag{2}$$

$$S_{(r)} = \frac{m}{m-1} - \frac{1}{m-1}\sqrt{\frac{mQ_o t}{r\varphi}} \quad r_w < r < r_{max} \tag{3}$$

$$r_{max} = \frac{mQ_o t}{\varphi} \tag{4}$$

The total water content of the transition zone is calculated for an axisymmetric condition which would be typical for a vertical well, but it can also be calculated for a horizontal well used for injection, estimated below as the 1D condition.

$$\int_{r_w}^{r_{max}} 2\pi r S_{(r)} dr = \frac{m}{2(m-1)}(r_{max} - r_w)^2 - \frac{1}{m-1}\sqrt{\frac{mQ_o t}{\pi \varphi}}(r_{max} - r_w) \tag{5}$$

And therefore, for 1D injection into a long horizontal well, the rate can be calculated $$\int_{r_w}^{r_{max}} S_{(r)} dr = \frac{m}{m-1}(r_{max} - r_w) - \frac{2}{m-1}\sqrt{\frac{mQ_o t}{\pi \varphi}}(r_{max}^{1/2} - r_{min}^{1/2}) \tag{6}$$

And the total injected gas is $$Q_t = Q_o t \tag{6}$$

And by writing a simple equation for equality of mass (M=100)

$$\int_{r_w}^{r_{max}} S_{(r)} = MQ_t \qquad (7)$$

Figure 12:
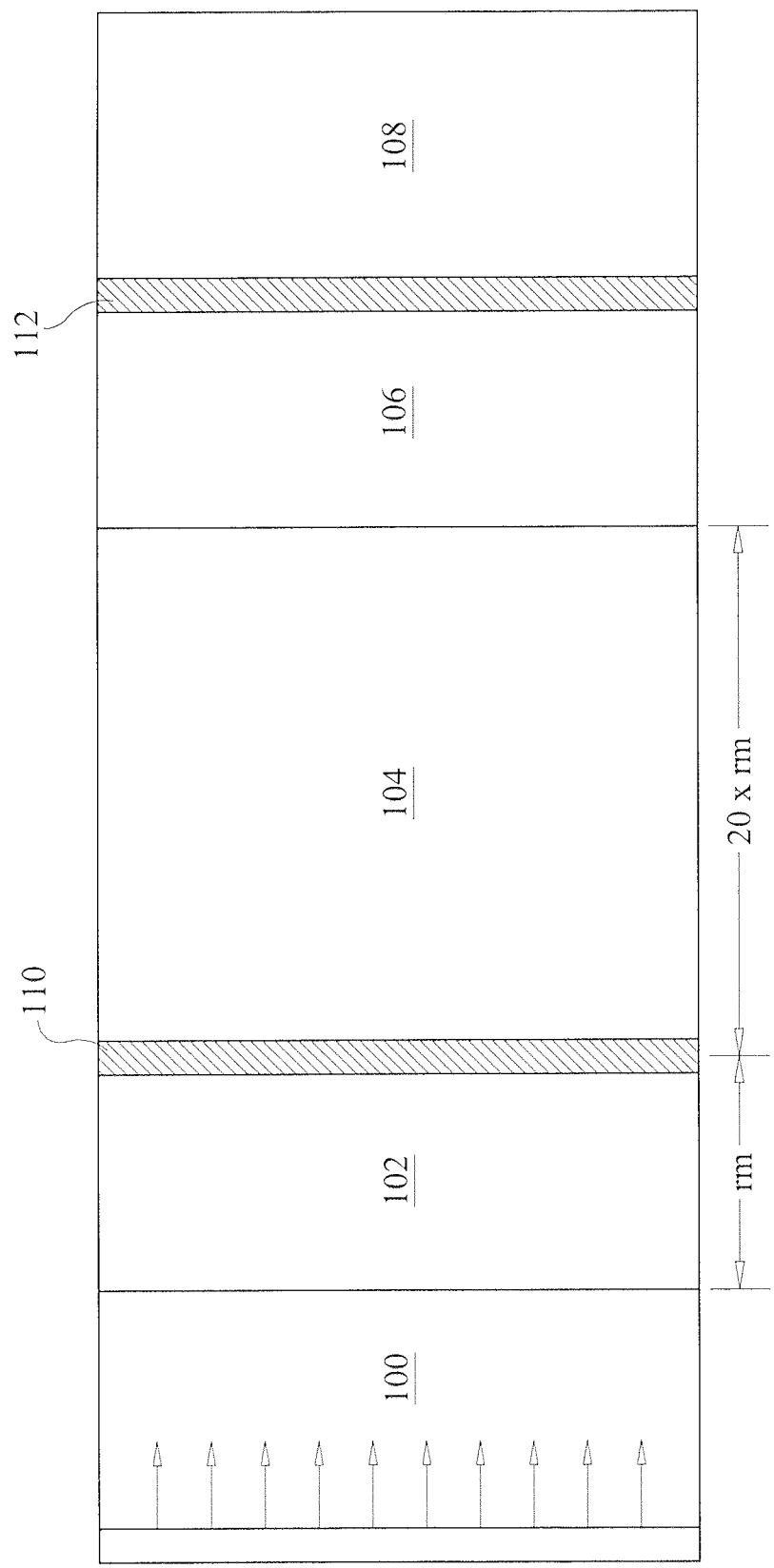
FIG. 12 schematically depicts regions within a formation showing the results of an injection of gas into the formation according to the invention.

For both cases of injection, axisymmetric and plane flow for the vertical well and the horizontal well respectively, the water content in the transition zone is much larger than the amount of the injected gas. In order to promote much faster mixing, cyclic injection is necessary, providing alternating waves of $CO_2$ and water, one after the other. In this case, because of viscosity differences, the interface between the gas and liquid injection phases is not stable, although the interface between the water and gas phases is stable because the viscosity of water is greater than the viscosity of the gas. A key factor in this patent is that an unstable front provides an excellent mixing zone of great internal surface area and eventually results in dissolution. The value of $r_m$ in the diagram of FIG. 12 and the height of the aquifer thus stipulate the mass of $CO_2$ injected during the $CO_2$ cycle, and the mass of water in the water cycle will typically be 20 times larger (discussed above). A suitable value for $r_m$ is on the order of 5 to 10 meters, typically, in order to achieve good mixing of water and gas. FIG. 12 schematically depicts regions within a formation containing, from left to right, saline water 100, $CO_2$ 102, saline water 104, an unstable front 110 between $CO_2$ 102 and saline water 104, $CO_2$ 106, saline water 108 and an unstable front 112 between $CO_2$ 106 and saline water 108.

The rate of dissolution of the CO2 body which is sandwiched between two waves of saline water can be calculated using a mathematical model which incorporates the kinetic mass transfer mechanism of dissolving of gas into water. Note also that the volumetric rate of water injection will be lower than the rate of gaseous injection, because of the higher viscosity of water; this is necessary to not exceed the pressure limits. (An alternative to rate calculations is to base injection pressures on the continuous read-out values from a pressure gauge placed in the bottom of the injection well.)

For a vertical well geometry with typical properties of m=10, Qo=10-4 (m3/s), $\phi$=0.25 and B=30, the time for continuous injection of gas to provide rm=5 (m) would be t=19635 (sec), or approximately 5 hours and 30 min. After this injection phase, 20 masses of water will be injected, and this would take on the order of 10 to 15 days (duration of water injection should be on the order of 40-50 times as long as the gas injection period).

For plane flow geometry with typical properties of m=10, Qo=10-5 (m3/s), $\phi$=0.25 and B=30. Therefore the time for continuous injection of gas for providing rm=5 (m) would be t=50000 seconds or about 13 hours and 50 min. Similarly, the water injection period will be on the order of 40 to 50 times as long because of the much larger mass involved and the higher viscosity.

Definition of terms:
S saturation
m ratio of mobilities
Q rate
☐ porosity
B thickness of aquifer
r radius

The invention claimed is:

1. A method for dissolving a greenhouse gas into formation water of a water-laden formation by generating an unstable front within the formation between formation water saturated with said greenhouse gas and formation water unsaturated with said greenhouse gas, said method comprising performing multiple cycles each comprising a first stage wherein said greenhouse gas is injected into said formation, followed sequentially by a second stage wherein an aqueous liquid is injected into said formation, wherein said stages are the same or different in duration and are each selected from several minutes, several hours, several days or several weeks, and wherein the mass ratio of said greenhouse gas to said aqueous liquid is between 1:20 and 1:100.

2. The method of claim 1 wherein said aqueous liquid is one or more of waste water, water produced with oil during an oil production operation, industrial effluent, municipal waste water, brackish water, fracturing fluids flowback water, seawater or water that contains a contaminant.

3. The method of claim 1 wherein said greenhouse gas comprises pure CO2 or a mixture of CO2 and one or more other gases.

4. The method of claim 3 wherein said mixture of CO2 and other gases comprises at least 60% CO2.

5. The method of claim 1 wherein the greenhouse gas comprises a supercritical fluid.

6. The method of claim 1 wherein said injection of each stage comprises injection through a horizontal well or a vertical well.

7. The method of claim 1 wherein the first stage is stopped when backward flux of said greenhouse gas is detected, and wherein the second stage comprises injection of said aqueous liquid that is unsaturated with salt.

8. The method of claim 1 wherein said formation is one of a structural trap, stratigraphic trap, laterally extensive formation trap or long flow path trap.

9. The method of claim 1 wherein said fluid is injected at a temperature that is substantially equal to a temperature of the formation at a location or locations where said fluid is injected.

10. The method of claim 1 wherein the mass ratio is between 1:20 and 1:40.

11. The method of claim 10 wherein the mass ratio is between 1:20 and 1:30.

12. The method of claim 11 wherein the mass ratio is about 1:20.

13. The method of claim 1 wherein said formation is an artificial porous formation located on or near a ground surface.

14. The method of claim 1 wherein said first and second stages are injected at a temperature that is substantially equal to a temperature of the formation where said first and second stages are injected.

15. The method of claim 1 wherein a duration of said second stage is 40 to 50 times as long as a duration of the first stage.

* * * * *